United States Patent
Hahn

(10) Patent No.: US 12,128,989 B2
(45) Date of Patent: Oct. 29, 2024

(54) BICYCLE ELECTRONIC CONTROL DEVICE AND SYSTEM

(71) Applicant: SRAM, LLC, Chicago, IL (US)

(72) Inventor: Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 738 days.

(21) Appl. No.: 16/718,479

(22) Filed: Dec. 18, 2019

(65) Prior Publication Data

US 2021/0188393 A1 Jun. 24, 2021

(51) Int. Cl.
*H01H 13/04* (2006.01)
*B60L 50/64* (2019.01)
(Continued)

(52) U.S. Cl.
CPC ............... *B62M 6/45* (2013.01); *B60L 50/64* (2019.02); *H01H 13/04* (2013.01);
(Continued)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 13/186; B62M 6/45; B62M 9/122; B62M 9/132; B62M 25/08; B60L 50/64; B60L 2200/12; H01Q 1/2283; H01Q 1/3208; H01Q 1/3291; H01Q 1/38; H01Q 9/42; B62K 23/00; B62K 23/02; Y02T 10/70

See application file for complete search history.

(56) References Cited

U.S. PATENT DOCUMENTS 8,730,110 B2 * 5/2014 Rao ................. H01Q 9/0421
343/893
9,211,936 B2 12/2015 Gao
10,293,884 B2 5/2019 Feuerstein
(Continued)

FOREIGN PATENT DOCUMENTS

CN 1856219 A 11/2006
CN 105480360 4/2016
(Continued)

OTHER PUBLICATIONS

Carey, David, "Motorola's Bluetooth headset: Headlong into hands-free", EDN.COM, Aug. 6, 2002, 6 pages, https://www.edn.com/motorolas-bluetooth-headset-headlong-into-hands-free/.
(Continued)

*Primary Examiner* — Ahmed M Saeed

(57) ABSTRACT

An electronic control device may be configured to be integrated, or coupled, with a bicycle to control bicycle components. The electronic control device may wirelessly control bicycle components to trigger an action when actuated. The electronic control device may be dimensioned to have a mating surface contoured to matingly engage with a mounting surface of a bicycle, such as on a handlebar. The electronic control device may also be dimensioned to have a compact and/or concealed appearance aided by a low profile relative to the bicycle mounting surface selected for the control device.

19 Claims, 18 Drawing Sheets

(51) Int. Cl.
    *B62M 6/45*     (2010.01)
    *H01H 13/18*     (2006.01)
    *H01Q 1/22*     (2006.01)
    *H01Q 1/32*     (2006.01)
    *B62K 23/00*     (2006.01)
    *B62K 23/02*     (2006.01)

(52) U.S. Cl.
    CPC ........ *H01H 13/186* (2013.01); *H01Q 1/2283* (2013.01); *H01Q 1/3208* (2013.01); *B60L 2200/12* (2013.01); *B62K 23/00* (2013.01); *B62K 23/02* (2013.01)

(56) References Cited

U.S. PATENT DOCUMENTS

| | | | |
|---|---|---|---|
| 2005/0195082 A1* | 9/2005 | Morrison | G08B 13/149 340/572.7 |
| 2006/0245146 A1 | 11/2006 | Sugimoto et al. | |
| 2012/0234659 A1* | 9/2012 | Huang | G05G 1/04 200/341 |
| 2015/0356861 A1* | 12/2015 | Daoura | G08B 21/0277 340/539.13 |
| 2017/0080993 A1 | 3/2017 | Bierwerth et al. | |
| 2019/0170727 A1* | 6/2019 | Jensen | G01N 33/48707 |
| 2019/0185109 A1 | 6/2019 | Howell-Mclean | |
| 2019/0382082 A1* | 12/2019 | Bierwerth | B62K 21/26 |

FOREIGN PATENT DOCUMENTS

| | | |
|---|---|---|
| CN | 107010156 A | 8/2017 |
| EP | 2594471 | 5/2013 |
| TW | 200932619 | 8/2009 |
| TW | 201927626 A | 7/2019 |

OTHER PUBLICATIONS

Carey, David, "Under the Hood: Motorola's HS810 Bluetooth headset has analog calling" EDN.COM, Jan. 25, 2005, 5 pages, https://www.edn.com/under-the-hood-motorolas-hs810-bluetooth-headset-has-analog-calling/.

* cited by examiner

US 12,128,989 B2

BICYCLE ELECTRONIC CONTROL DEVICE AND SYSTEM

BACKGROUND

Traditional hand actuated control devices such as shifters and/or brake levers for bicycles and other handlebar-steerable vehicles may include levers and/or other mechanisms attached to handlebars of a bicycle. These mechanisms are configured to control various types of mechanical or electromechanical bicycle components, such as drive system components, braking components, and/or suspension components. Traditional levers or other devices may be specifically designed for particularly configured handlebar orientations and/or particular placement within a handlebar orientation. Further, the traditional mechanisms may include bulky parts or assemblies that are not easily placed in alternate positions throughout handlebar orientations, or in other locations of the bicycle.

SUMMARY

According to one aspect, an electronic control device for a bicycle comprises a housing, a planar printed circuit board ("PCB") within the housing, and a power source within the housing. The planar PCB has a substrate and circuitry attached to the substrate; the substrate has a thickness. A plane extends throughout the thickness of the substrate and intersects the power source.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

The present disclosure provides examples of bicycle electronic control devices that solve or improve upon one or more of the above-noted and/or other disadvantages with prior known mechanical and electrical control devices. An electronic control device may be configured to be integrated, or coupled, with a bicycle to control bicycle components. The electronic control device may communicate wirelessly with bicycle components to trigger an action when actuated. The electronic control device may be dimensioned to have a mating surface contoured to matingly engage a tubular or otherwise curved surface of a bicycle, such as a handlebar. The electronic control device may also be dimensioned to have a compact and/or concealed appearance aided by a low profile relative to the bicycle mounting surface. For example, the electronic control device may include a printed circuit board assembly ("PCB"), a power source, and antenna intersecting a plane defined by a thickness of a substrate of the PCB to facilitate a reduction of a height and/or length dimensions of the electronic control device. The antenna of the electronic control device may be strategically placed to increase the surface area of the antenna while adding no or marginal height to the PCB. The height of the antenna is equal to or greater than the thickness of the substrate. In an embodiment, the height of the antenna is less than the thickness of the substrate. The electronic control device may be used with other control devices to control bicycle components.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

Figure 1:
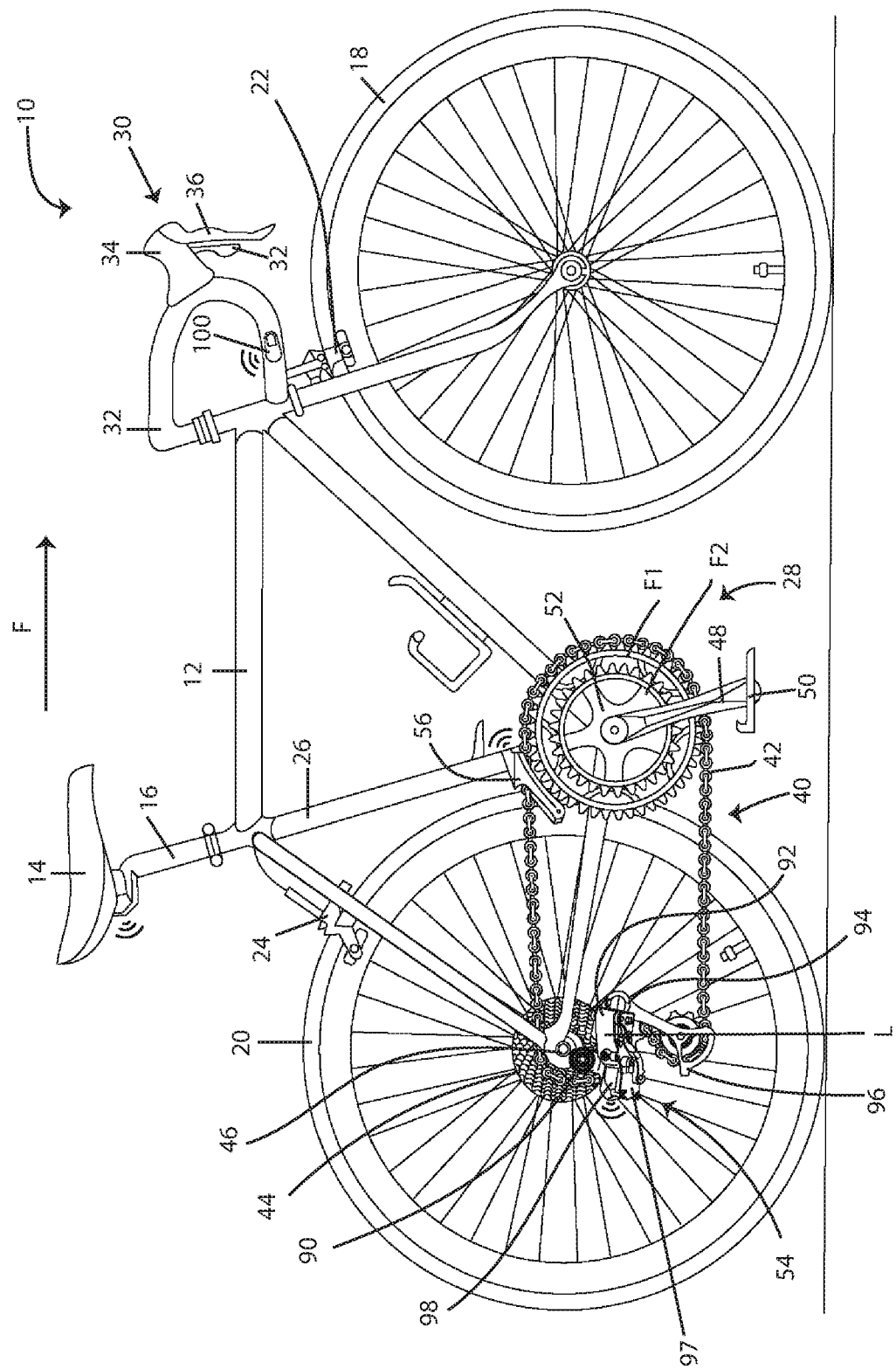
FIG. 1 is a right-side elevational view of a bicycle according to one embodiment.

FIG. 1 generally illustrates a bicycle 10, which may be used to implement one or more electronic control devices disclosed herein. The bicycle 10 includes a frame 12, front and rear wheels 18, 20 rotatably attached to the frame 12, and a drivetrain 40. A front and/or forward riding direction or orientation of the bicycle 10 is indicated by the direction of the arrow F in FIG. 1. As such, a forward direction for the bicycle 10 is indicated by the direction of arrow F.

A front brake 22 is provided for braking the front wheel 18 and a rear brake 24 is provided for braking the rear wheel 20. The bicycle 10 also includes a seat or saddle 14 near a rear end of the frame 12 attached to a seat post 16 connected to the frame 12. The drivetrain 40 includes a chain 42, a front crank assembly 28 including crank arms 48, one or more chainrings 52, a front derailleur 56 attached to a seat tube 26 of the frame 12, and pedals 50. The drivetrain 40 further includes a rear derailleur 54 and a rear sprocket assembly 44 coaxially mounted to the rear wheel 20 via a hub 46. A handlebar assembly 30 is attached to a forward end of the frame 12 for user, or rider, to control the bicycle 10. The handlebar assembly 30 may include handlebars 32, shifter hoods 34, shift leavers 38, and an electronic control device 100. The handlebar assembly 30 may also include a brake lever 36 that is configured to operate the front brake 22. The rear brake 24 is operated by a brake lever (not shown) also located on the handlebar assembly 30.

In this example, there are two chainrings 52, F1 and F2, each having teeth around a respective circumference. The number of teeth on the smaller diameter front sprocket F2 of the chainring 52 may be less than the number of teeth on the larger diameter sprocket F1. A front derailleur 56 may be operated to move from a first operating position to a second operating position to move the chain 42 between the front sprockets F1 and F2.

In an alternate example, the drivetrain 40 may involve only a single sprocket on a front chainring 52, and as such may not include a front derailleur, such as front derailleur 56.

As shown in FIG. 1, the rear sprocket assembly 44 may include a plurality (e.g., eleven) of coaxially mounted gears, cogs, or sprockets. Each sprocket also has teeth arranged around a respective circumference. The numbers of teeth on the rear sprockets may gradually decrease from the largest diameter rear sprocket to the smallest diameter sprocket. The rear derailleur 54 may be operable to move between different operating positions to switch the chain 42 to a selected one of the rear sprockets.

The rear derailleur 54 is depicted in these examples as a wireless, electrically actuated rear derailleur mounted or mountable to the frame 12, or frame attachment, of the bicycle 10. The electric rear derailleur 54 has a base member 90 (e.g., a b-knuckle) that is mounted to the bicycle frame 12. A linkage 92 has two links L that are pivotally connected to the base member 90 at a base member linkage connection portion. A movable member 94 (e.g., a p-knuckle) is connected to the linkage 92. A chain guide assembly 96 (e.g., a cage) is configured to engage and maintain tension in the chain and is pivotally connected to a part of the movable member 94. The cage 96 may rotate or pivot about a cage rotation axis in a damping direction and a chain tensioning direction.

In an alternate example, the rear sprocket assembly 44 may have more or fewer sprockets. For example, in an embodiment, a rear sprocket assembly 44 may have twelve or thirteen sprockets. Dimensions and configuration of the rear derailleur 54 may be modified to accommodate a specific implemented plurality of sprockets. For example, an angle and length of the linkage 92 and/or the configuration of the cage 96 of the rear derailleur 54 may be modified to accommodate specific sprocket combinations.

Returning to the example rear derailleur 54 of FIG. 1, a motor module 97 is carried on the rear derailleur 54 and has a powers source, such as a battery 98. The battery 98 supplies power to the motor module 97. In one example, the motor module 97 is located on the movable member 94. However, the motor module 97 may be located elsewhere on the rear derailleur 54. The motor module 97 may include a gear mechanism or transmission. The motor module 97 and gear mechanism may be coupled with the linkage 92 to laterally move the cage 96 and thus switch the chain 42 among the rear sprockets on the rear sprocket assembly 44.

The battery 98 may instead be an alternate power supply or power source and may operate other electric components of the bicycle 10 within a linked system. Further, multiple power supplies may be provided, which may collectively or individually power the electric components of the system, including the rear derailleur 54, such as a drive motor for an embodiment involving an electrically powered bicycle. Additional batteries or other power supplies may be attached to the derailleur or located at other positions, such as the frame 12. In this example, the battery 98 is configured to be attached directly to the rear derailleur 54, and to provide power only to the components of the rear derailleur 54.

As shown in FIG. 1, an electronic control device 100 is mounted to the handlebars 32 for wirelessly actuating the motor module 97 and operating the rear derailleur 54 for executing gear changes and gear selection. Multiple electronic control devices 100 may be used with the bicycle 10. The electronic control device 100 is configured to actuate or otherwise control components of the bicycle 10. For example, the electronic control device 100 may be configured to control gear shifting of the front derailleur 56 and/or the rear derailleur 54. The electronic control device 100 may also be configured to control characteristics of other bicycle components, such as a seat post 16 or a suspension system (not shown). Additionally, the electronic control device 100 may be configured to control pairing (of the electronic control device 100 with bicycle components or other devices) or adjust an operational mode.

In other embodiments, the electronic control device 100 may be placed on other locations of the bicycle 10. The electronic control device 100 may also be situated on locations other than on the bicycle 10, such as, for example, on a rider's wrist or in a jersey pocket. The electronic control device 100 may include a processor, communication device (e.g., a wireless communication device), a memory, and one or more communication interfaces.

While the illustrated bicycle 10 is a road bike, the present disclosure has applications to bicycles of any type, including fully or partially suspensioned mountain bikes and others, as well as bicycles with mechanical (e.g., cable, hydraulic, pneumatic) and non-mechanical (e.g., wired, wireless) drive systems. For example, the illustrated handlebar assembly 30 involves a drop bar configuration, however, the control device 100 may be used with other types of handlebar assemblies as well, such as aero-bar configurations, bullhorn bars, riser bars, or any other type of bicycle handlebar. Also, while the embodiments described herein describe electronic control devices attached to handlebars, a person having experience in the art would recognize the possible positioning of the electronic control devices 100 at other areas of a bicycle, such as locations throughout the frame 12.

It is to be understood that the specific arrangement and illustrated components of the frame 12, the front wheel 18, the rear wheel 20, the drivetrain 40, the front brake 22, and the rear brake 24 are nonlimiting to the disclosed embodiments. For example, while the front brake 22 and the rear brake 24 are illustrated as hydraulic rim brakes, hydraulic disc brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

Figure 2:
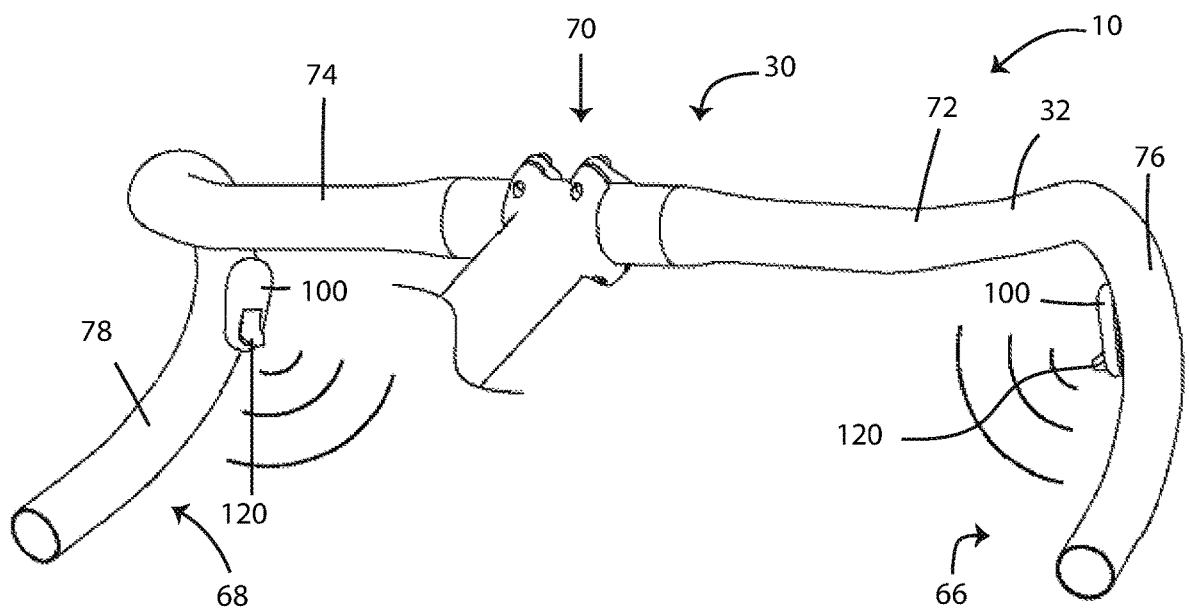
FIG. 2 is a view of the handlebar assembly including an example of the electronic control devices in communication with a component of FIG. 1.
Figure 2:
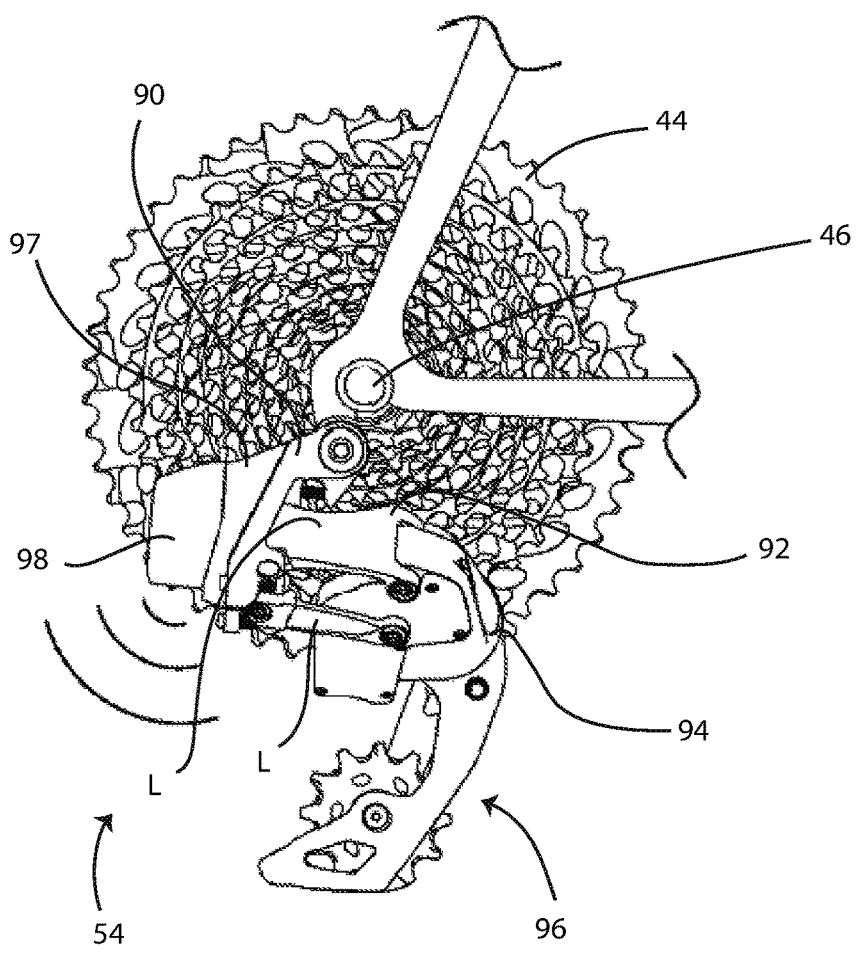
Figure 3A:
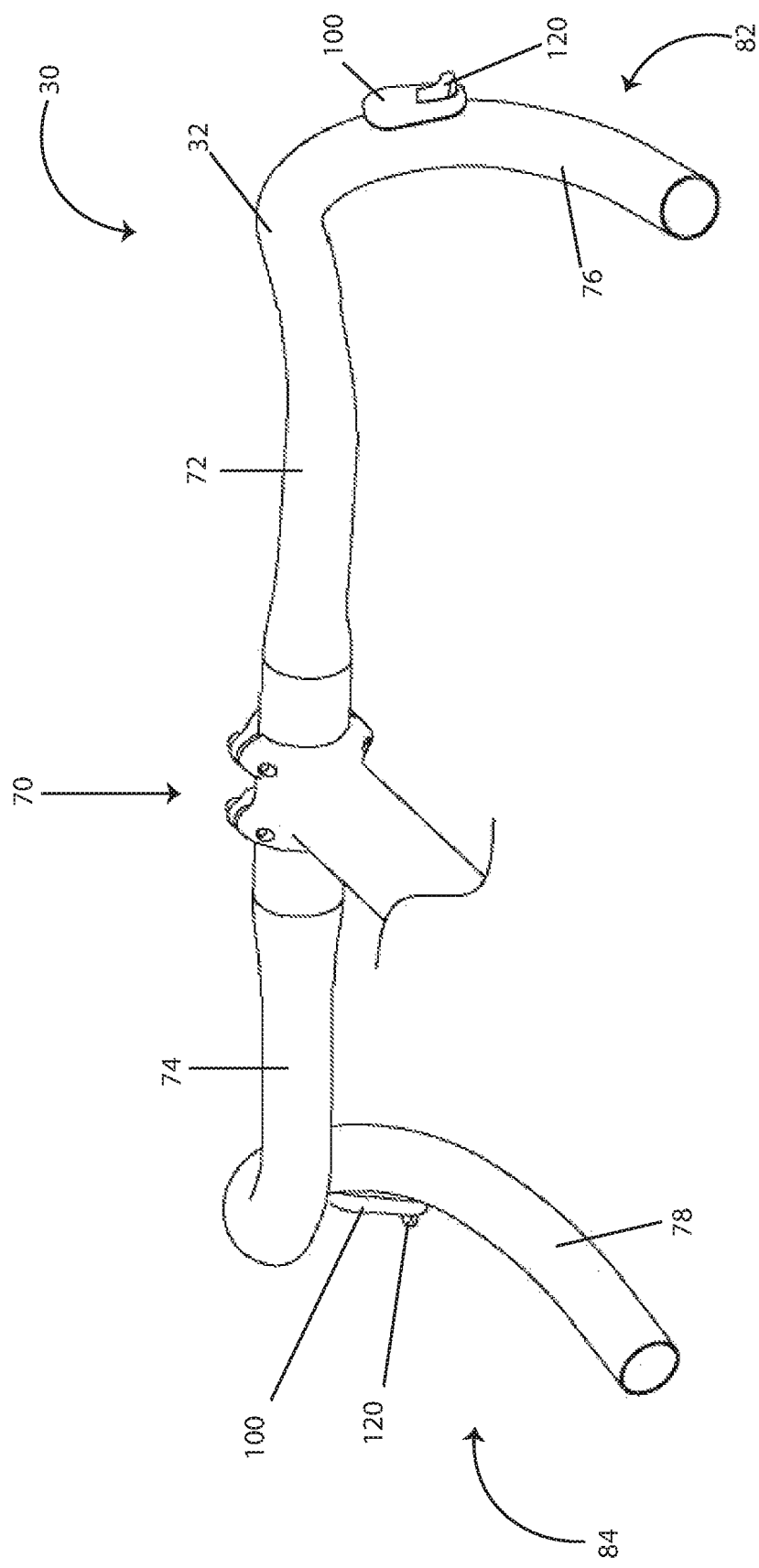
FIG. 3A-3B are additional views of the handlebar assembly of FIG. 1 including examples of the electronic control devices in different locations on the handlebar assembly.
Figure 3B:
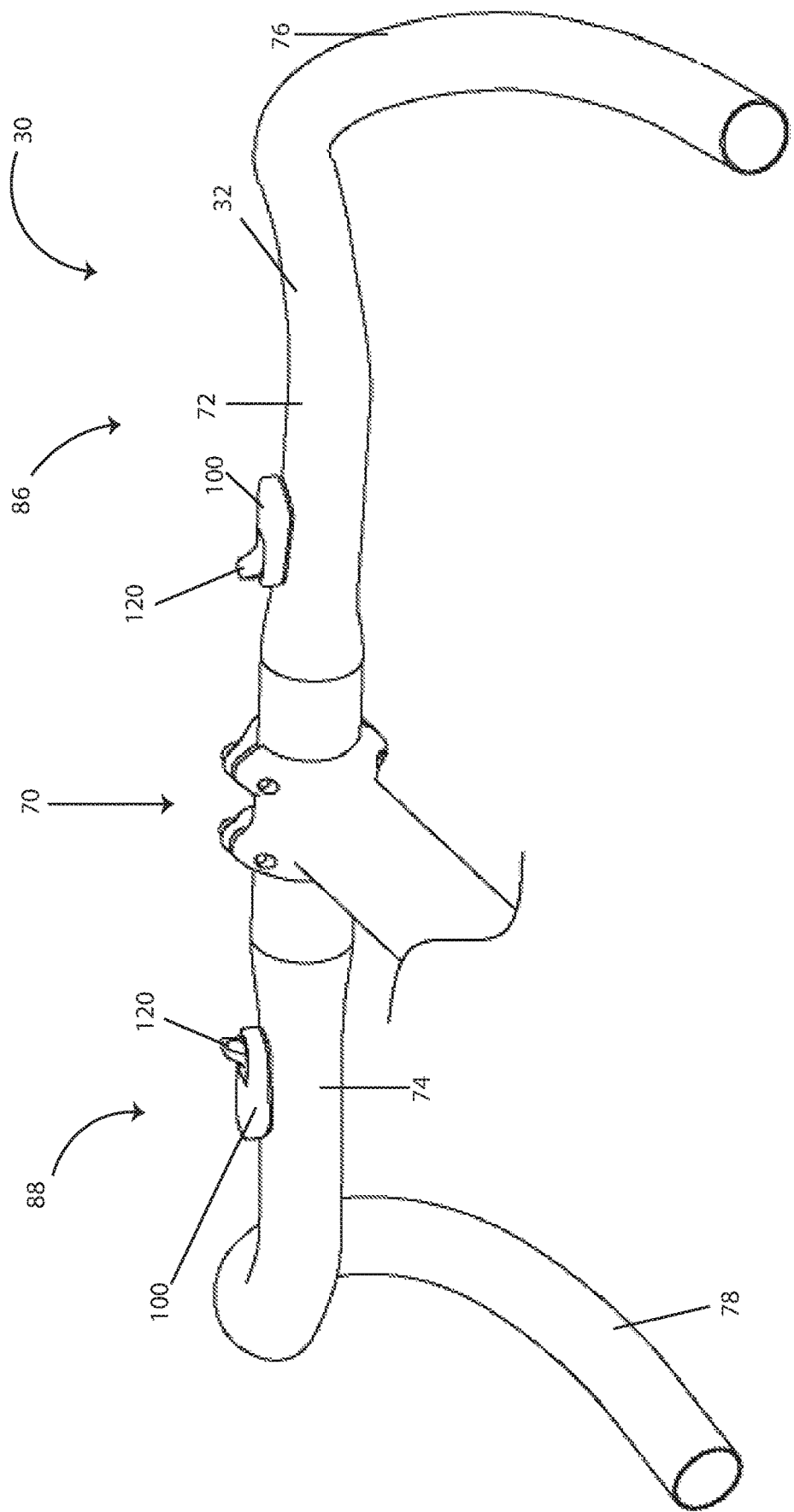

FIG. 2 is a view of the electronic control devices 100 on the handlebar assembly 30 in communication with the rear derailleur 54. All directional reference in the description of the embodiments in FIGS. 2-3B are relative to a forward direction indicated by the arrow F of the bicycle 10 in FIG. 1. The handlebar assembly 30 as shown is a drop-bar assembly which includes a right straight portion 72 and a left straight portion 74 located to the right and left, respectively, of a center 70 of the handlebar 32. A rightmost end of the right straight portion 72 is connected to a right drop portion 76 that curls downward and then away from a forward direction F of the bicycle 10. A leftmost end of the left straight portion 74 is connected to a left drop portion 78 that curls downward and then away from the forward direction F of the bicycle 10. In this example, the electronic control devices 100 are located on a right inside surface 66 of the right drop portion 76 and a left inside surface 68 of the left drop portion 78. The electronic control devices 100 include buttons 120 to be pressed by a rider of the bicycle 10. When actuated by the rider, the electronic control devices 100 wirelessly operate the rear derailleur 54 for executing gear changes and gear selection. For example, an actuation of the electronic control device 100 on the left drop portion 78 of the handlebar 32 by the rider of the bicycle 10 shifts the rear derailleur 54 inwards towards the bicycle 10. An actuation of the electronic control device 100 on the right drop portion 76 of the handlebar 32 by the rider of the bicycle 10 shifts the rear derailleur 54 outwards away from the bicycle 10. In other embodiments, the electronic control devices 100 may perform different functions. For example, the electronic control devices may shift the front derailleur 56 or adjust the seat post 16.

In this example, the electronic control devices 100 are oriented with buttons 120 being downwards or away from the right straight portion 72 and the left straight portion 74 of the handlebars 32. This may be beneficial for a rider with hands gripping the left drop portion 78 and the right drop portion 76 of the handlebars 32, such as when the rider is sprinting, so that the rider's thumbs may easily actuate the buttons 120. In an alternate example, the electronic control devices 100 may be flipped such that buttons 120 may be oriented upwards or closer to the right straight portion 72 and the left straight portion 74 of the handlebars 32. Further, the electronic control devices 100 may be located on different areas of the handlebars 32 or on the bicycle 10 with any variety of orientations. For example, FIGS. 3A-3B show the handlebar assembly 30 with the electronic control devices 100 placed in varying locations and orientations. In FIG. 3A, the electronic control devices 100 are located on a right outside surface 82 of the right drop portion 76 and a left outside surface 84 of the left drop portion 78. In the example shown in FIG. 3A, the electronic control devices 100 are oriented with the buttons 120 downward or away from the right straight portion 72 and the left straight portion 74 of the handlebars 32.

In FIG. 3B, the electronic control devices 100 are located on a right top surface 86 of the right straight portion 72 and a left top surface 88 of the left straight portion 74 of the handlebars 32. In the example, the electronic control devices 100 are oriented with buttons 120 towards to the center 70 of the handlebars 32.

As noted previously, the electronic control devices 100 may be oriented in any direction and on any portion of the handlebar 32 or the bicycle 10. In an alternate embodiment, there may be more or less than two electronic control devices 100 on the bicycle 10. Further, the electronic control devices 100 may be fully or partially covered by handlebar tape. The handlebar tape may be used to secure the electronic control devices 100 to the handlebars 32. Alternatively, the control devices 100 may include securing features (not shown) to secure the electronic control devices to the handlebars 32. For example, the securing features may include a mounting bracket or contours to matingly engage with an accessory mounting bracket, straps/bands, fasteners, double sided tape, etc. that secure the electronic control devices 100 to the bicycle 10.

Figure 4:
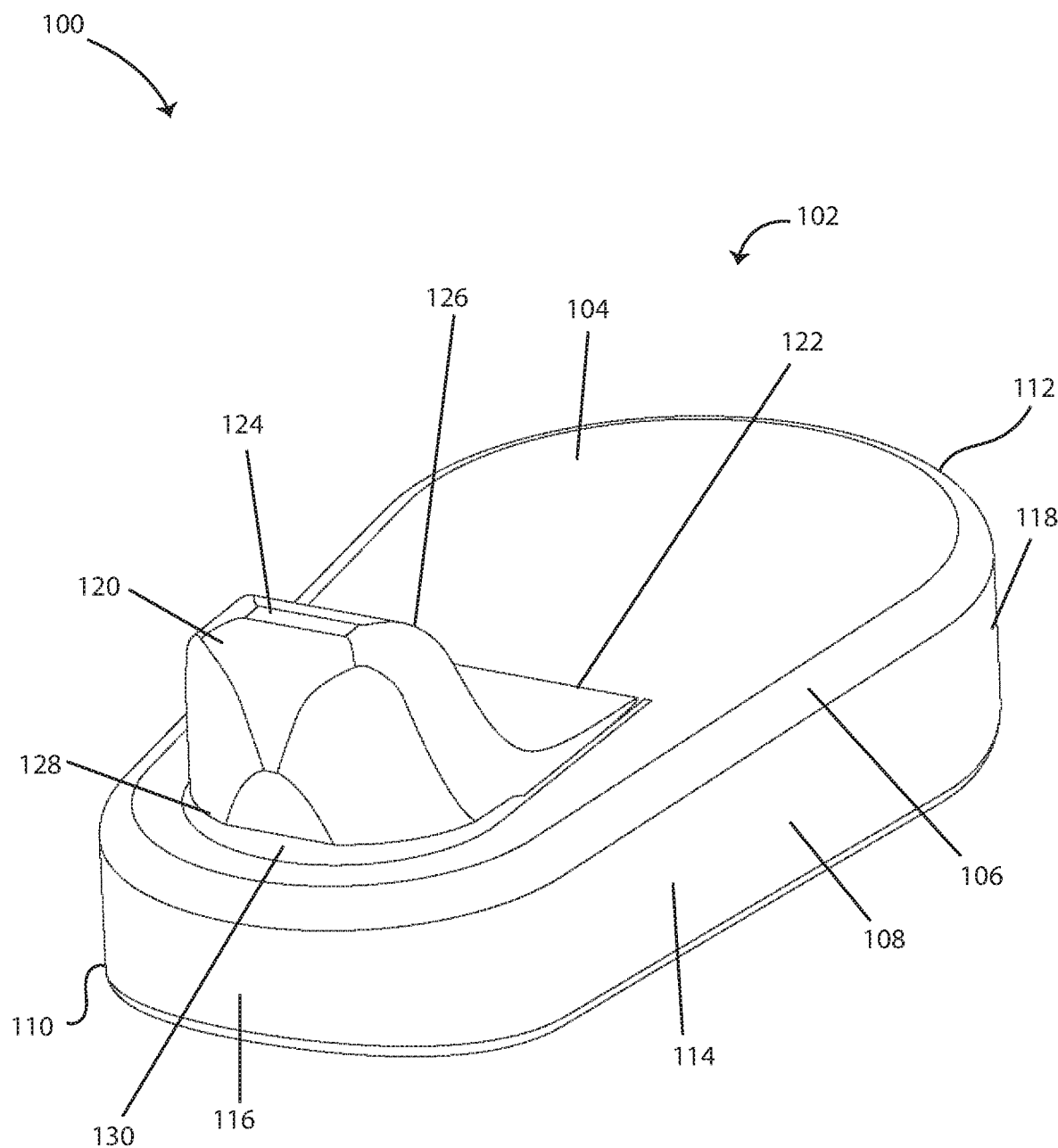
FIG. 4 is a front perspective view of an electronic control device according to one embodiment.
Figure 5:
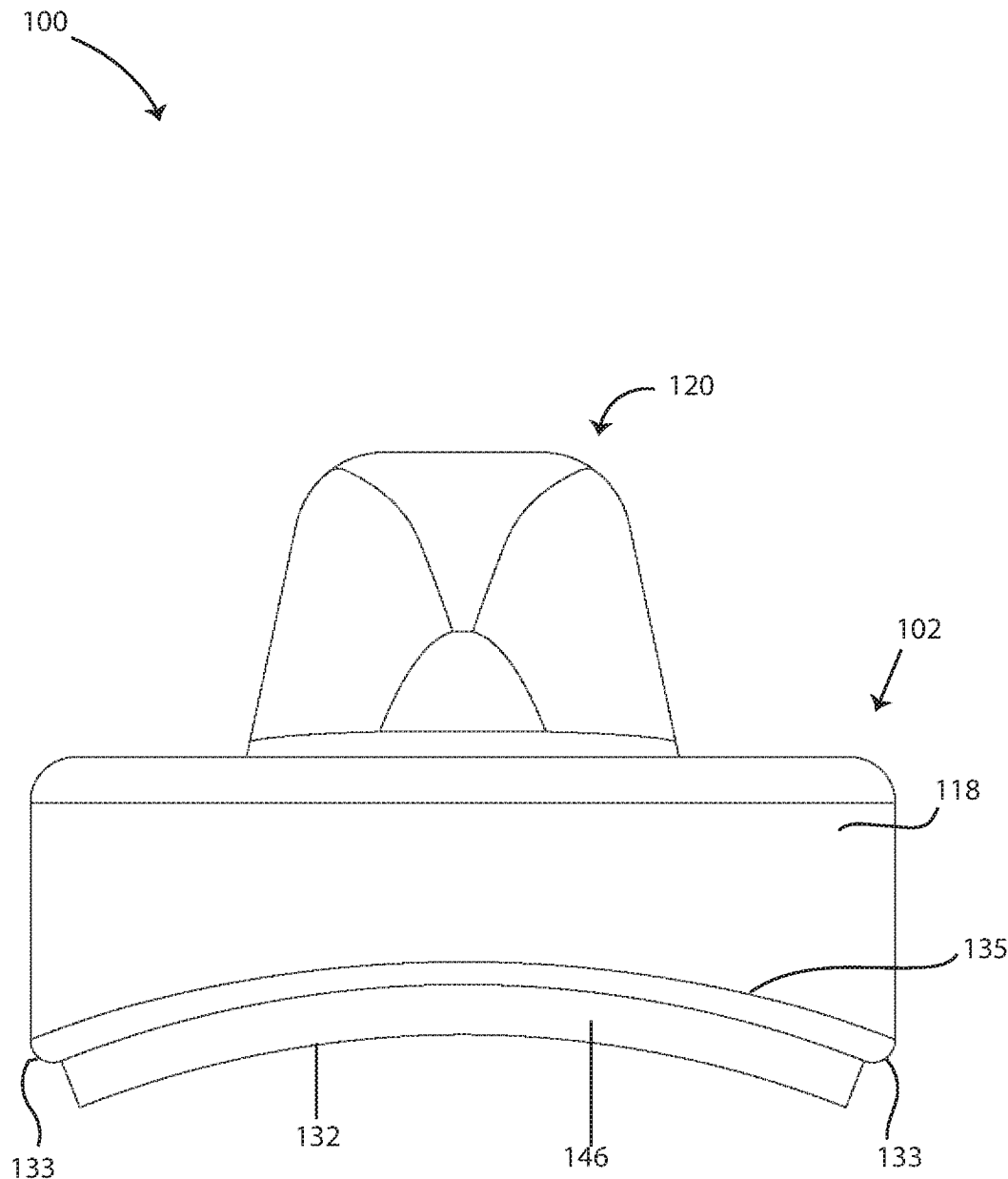
FIG. 5 is a rear perspective view of the electronic control device of FIG. 4.
Figure 6:
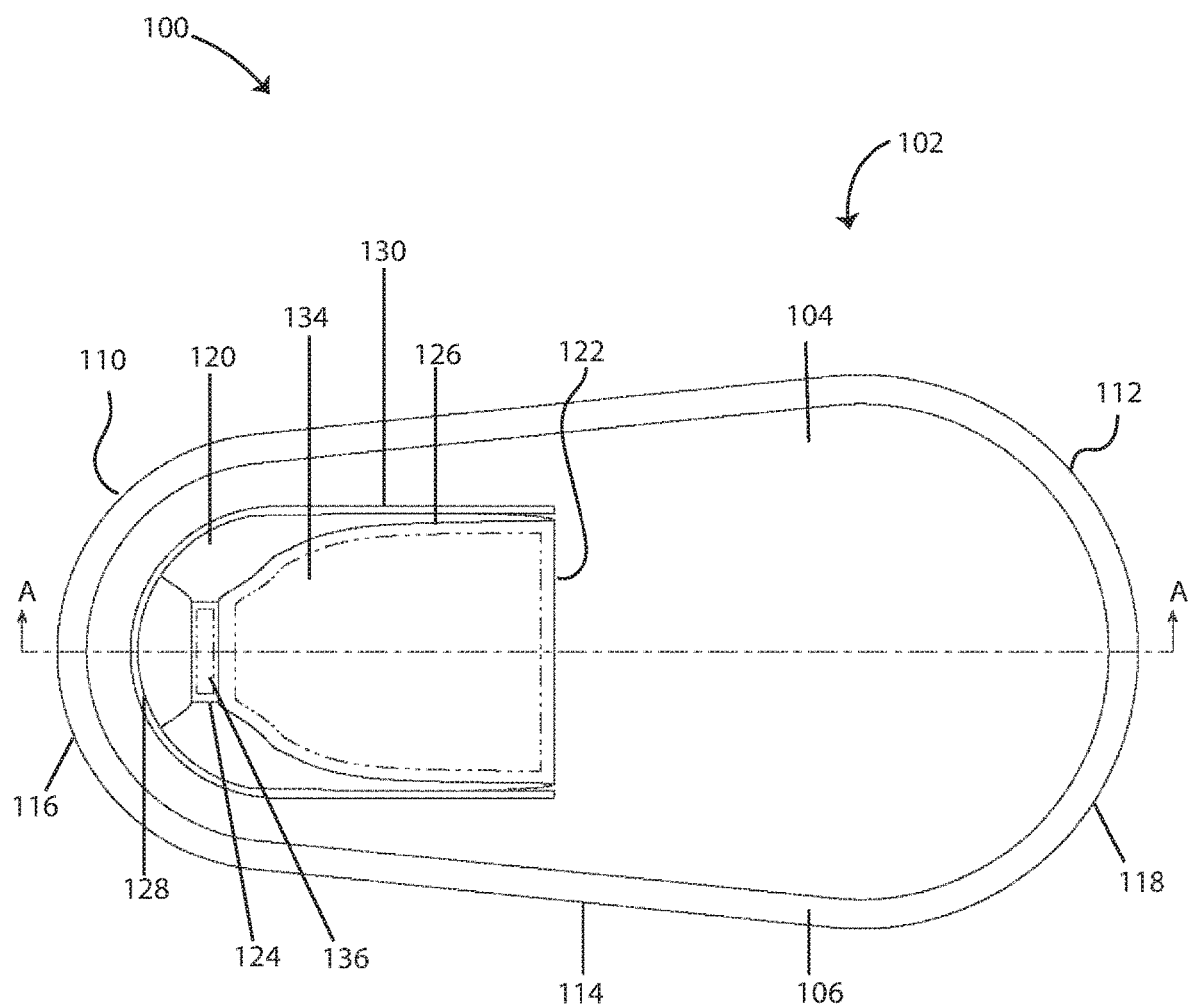
FIG. 6 is a top view of the electronic control device of FIG. 4.

FIGS. 4-6 are varying perspective views of the electronic control device 100 according to one embodiment. FIG. 4 depicts a housing 102 having a top surface 104 connected to a rounded edge 106. The rounded edge 106 connects to a sidewall 108. The housing 102 also includes a bottom surface 146 (not shown). The housing 102 includes a first end 110 and a second end 112. A flat portion 114 of the sidewall 108 connects to a front curve 116 of the housing 102 at the first end 110 and a rear curve 118 of the housing 102 at the second end 112. The top surface 104 of the housing 102 includes an opening 130 (or relief channel) above which a button 120 is disposed. The button 120 is connected to the top surface 104 of the housing 102 via a hinge 122. In an embodiment, the housing 102, the button 120, and the hinge 122 are integrally formed as a single piece unitary structure. For example, the housing 102, the button 120, and the hinge 122 are integrally formed from a single material. The hinge 122 may be a flexible hinge connecting the button 120 and the housing 102.

The button 120 includes an inclined or curved portion 126 connected to the hinge 122 and a flat top portion 124. The flat top portion 124 is the highest point of the button 120, or, in other words, the furthest point of the button 120 from the top surface 104 of the housing 102. The button 120 additionally includes a free end 128 opposite the end connected to the hinge 122. The free end 128 may act as a cantilever and may dip slightly into the opening 130 when a force is applied on the button 120. In the example, the opening 130 is slightly larger than the button 120 in order to allow the button 120 to move freely into and out of the opening 130.

In an alternate example, the opening 130 may be larger or smaller depending on the method employed to prevent the ingress of water, oil, dirt, etc. through the opening or onto components within the housing 102.

FIG. 5 is a rear perspective view of the electronic control device 100. FIG. 5 depicts the housing 102 of the electronic control device 100 having a bottom surface 146. The housing 102 may have extended sides 133 to provide a rounded surface 135 contoured to a mounting surface of the bicycle 10. The bottom surface 146 may be attached to the rounded surface 135 of the housing 102, matching its shape, and includes a mating surface 132 configured to matingly engage the mounting surface of the bicycle 10. For example, the mounting surface (e.g., the handlebars 32) of the bicycle 10 may be curved and the mating surface 132 of the bottom surface 146 and/or the rounded surface 135 may be contoured to fully or partially match the curve of the bicycle surface. In the example, the curve of the rounded surface 135 and the bottom surface 146 extends along the entirety of the rounded surface 135 and the bottom surface 146. In an alternate embodiment, the curve of the rounded surface 135 and the bottom surface 146 extends less than the entirety of the rounded surface 135 and the bottom surface 146.

In a further alternate example, the bottom surface 146 and the rounded surface 135 may be the same surface. In an additional alternate example, the bottom surface 146 and the rounded surface 135 may include additional layers of material between the two surfaces.

FIG. 6 is a top view of the electronic control device 100. As seen in FIG. 4, the button 120 is oriented towards the first end 110 of the housing 102. The curved portion 126 of the button 120 includes a first actuation surface 134. The flat top portion 124 of the button 120 includes a second actuation surface 136. A force applied by a user or rider of a bicycle on either the first actuation surface 134 or the second actuation surface 136 causes a downward movement of the button 120. The downward movement of the button 120 results in a downward displacement of button 120 into the opening 130. The direction of the force on the first actuation surface 134 and/or the second actuation surface 136 of the button 120 may be a downward force, a force applied towards the first end 110, or a combination thereof. The button 120 is biased such that after a user ceases applying force on the first actuation surface 134, the second actuation surface 136, or both, the button 120 will move upward returning to its resting position.

When viewed from above as in FIG. 6, the housing 102 is an oval shape, the first end 110 being narrower, or having a smaller radius, than the second end 112. In the example, this shape of the housing 102 is used to minimize the size of the housing 102 and optimize space by matching the structure of components (a PCB and a power source) within the housing 102. In alternate embodiments, the housing could have any shape and may be circular, rectangular, or polygonal. Additionally, the button 120 may be any size or shape so long as the housing 102 includes a protrusion, such as the button 120 extending outward from the housing 102 that may be pressed by the rider/user of a bicycle 10.

Figure 7A:
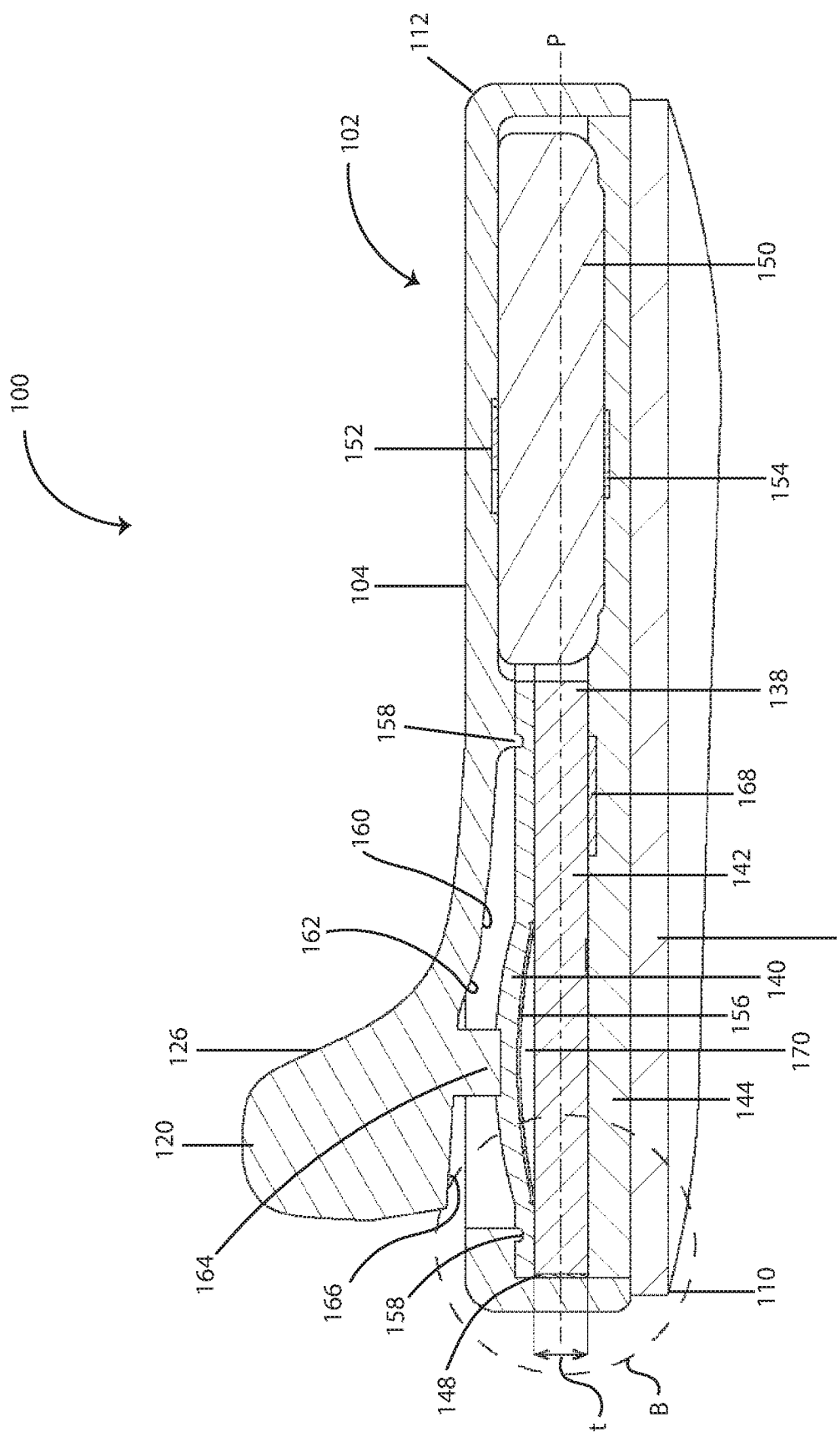
FIG. 7A is a sectional view of the electronic control device of FIG. 4 taken along cross section A-A as seen in FIG. 6.
Figure 7B:
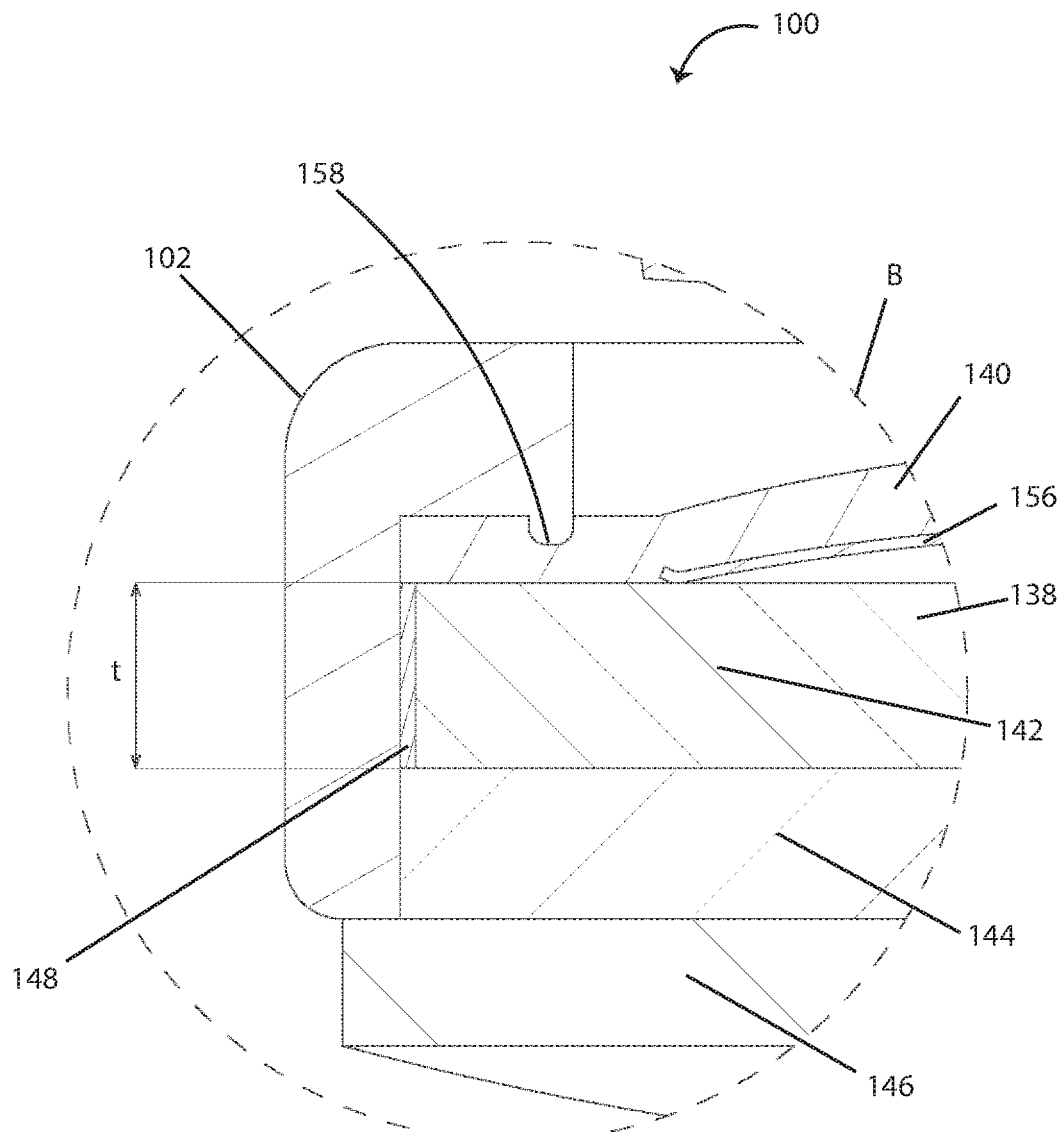
FIG. 7B is an enlarged view of detail B seen in FIG. 7A of the electronic control device of FIG. 4.
Figure 8:
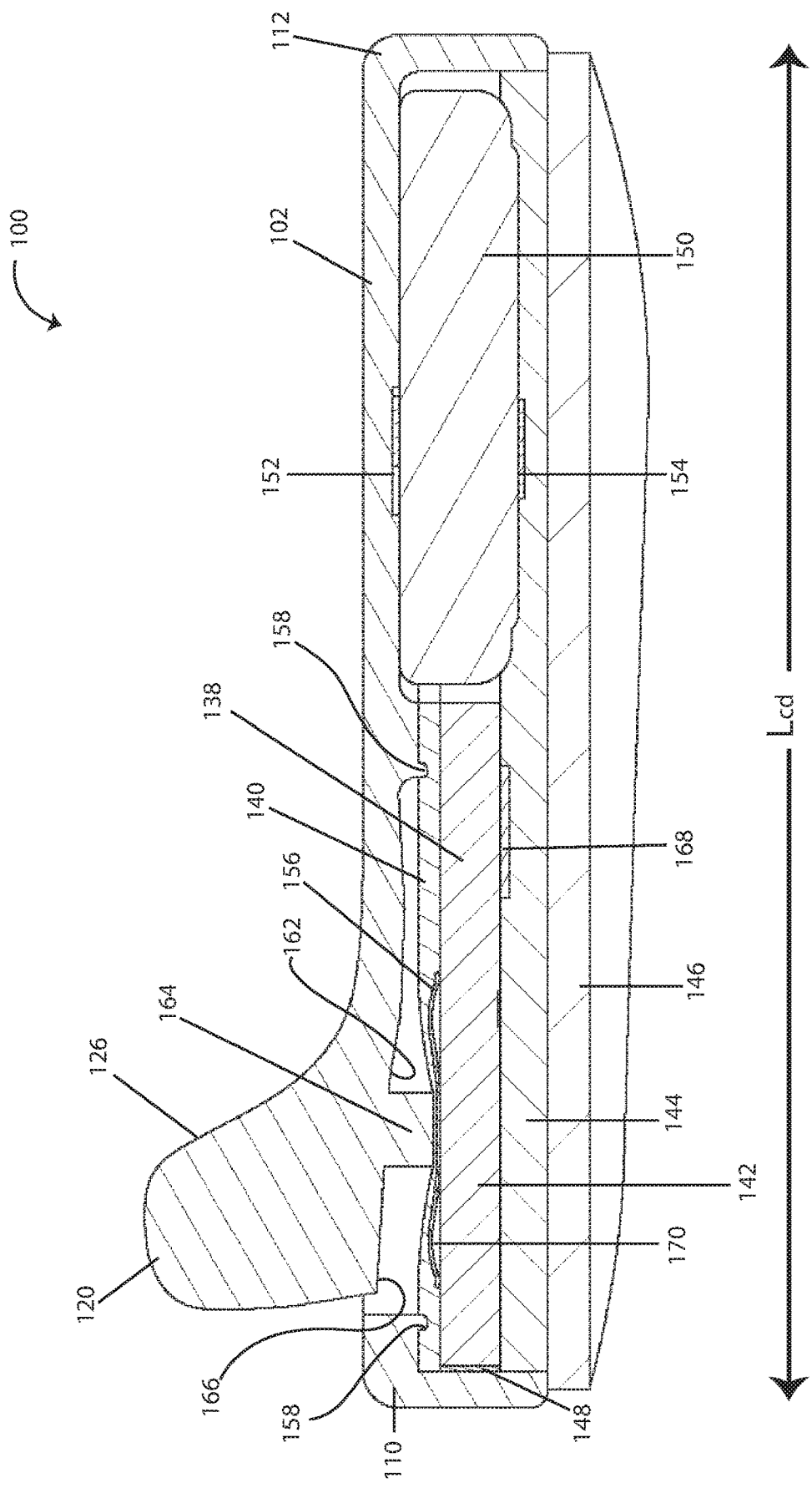
FIG. 8 is a sectional view of the electronic control device of FIG. 4 taken along cross section A-A as seen in FIG. 6, where a button 120 is in an actuated position.

FIGS. 7A, 7B, and 8 provide sectional and detailed views of the electronic control device 100. FIG. 7A is a sectional view along the line A-A seen in FIG. 6. FIG. 7A depicts the housing 102 and the button 120. The button 120 includes an inside surface 160. The inside surface 160 includes an incline portion 162 curving up towards a protrusion 164 on a first side of the protrusion 164, and a flat portion 166 on a second side of the protrusion 164.

Inside the housing 102 is a PCB assembly 138 having a substrate 142. Herein after, the PCB assembly 138 will be referred to as PCB 138. The orientation and location of the substrate 142 defines a plane P running through the substrate 142. On a first side of the substrate 142 (the side above the plane P; the side closest to the button 120) is a contact (not shown) located on the substrate 142 and an electrical switch 156. The switch 156 may be a dome switch or, more specifically, a snap dome switch, leaving a dome shaped gap 170 between the switch 156 and the contact (not shown) located on the substrate 142. In the example, the snap dome switch may be 8.5 mm, 10 mm, 12 mm, or 14 mm. Additionally, in the example, the PCB 138 is a planar PCB 138 that may be a system-on-a-chip (SoC) integrated circuit. The SoC may be of the chip-scale package type to achieve a smaller device size.

On top of the switch 156 is a gasket 140. The gasket 140 is used for waterproofing the first side of the PCB 138. The housing 102 includes a rib 158 on the inside wall of the housing 102 surrounding the button 120. The rib 158 concentrates force on the gasket 140.

On a second side of the substrate 142 (the side below the plane P; the side furthest from the button 120) is circuitry 168. The circuitry 168 is sealed by a potting material 144 which is covered by the bottom surface 146 of the housing 102.

Figure 13:
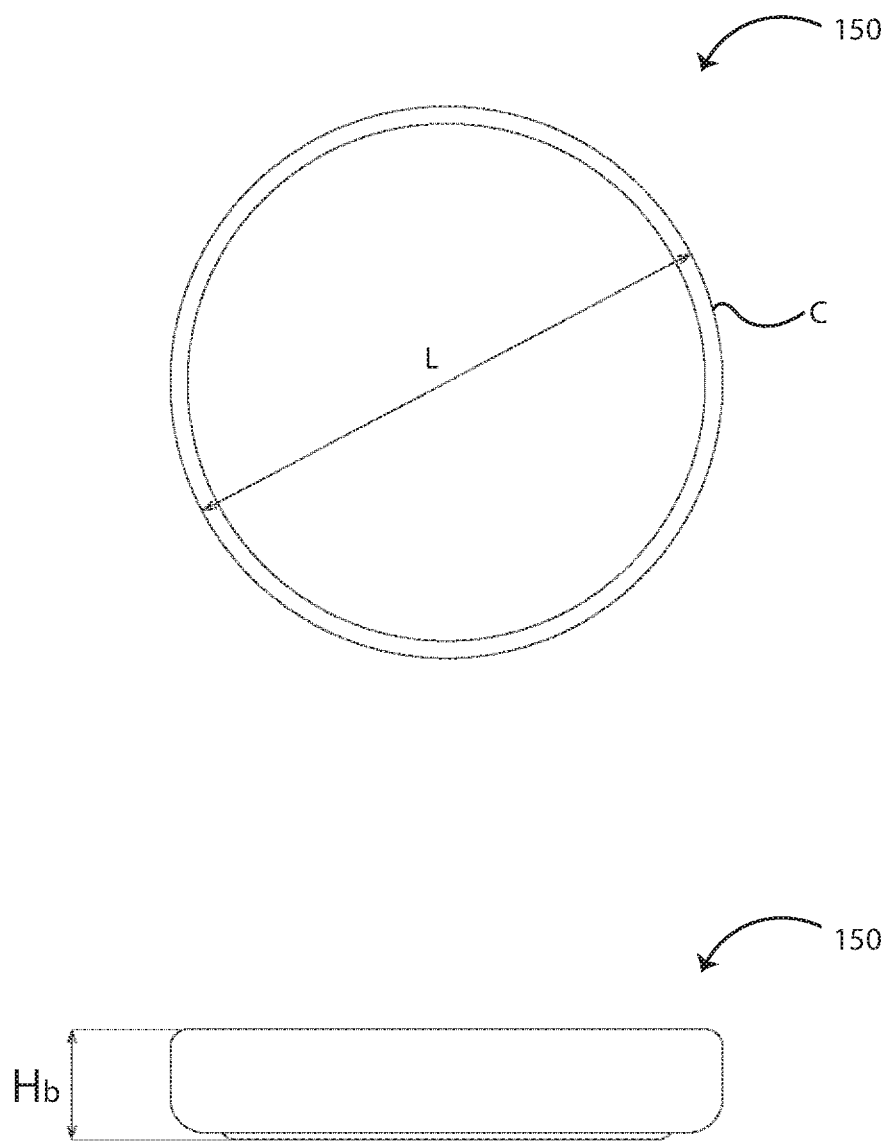
FIG. 13 is a bottom view and a side view of the power source of the electronic control device of FIG. 4.

Within the housing 102 is a power source 150. As seen in FIG. 13, the power source 150 includes a length (diameter) L, a circumference C, and a height $H_b$. The length L of the power source 150 is substantially greater than the height $H_b$ of the power source 150. For example, the length L of the power source 150 is at least 3× greater than the height $H_b$ of the power source 150. In the displayed embodiment, the power source 150 is oriented within the housing 102 such that the entire length L of the power source 150 intersects the plane P. On the power source 150 is a top weld tab 152 and a bottom weld tab 154, which are metal tabs welded to electrical terminals on the power source 150. The top weld tab 152 and the bottom weld tab 154 are soldered to the substrate 142 of the PCB 138, electrically connecting the PCB 138 and the power source 150.

The protrusion 164 of button 120 includes a flat surface that interfaces with the gasket 140 above a center of the switch 156. The button 120, or the first rigid protrusion, extends a first distance, the first distance being in a direction away from the switch and extending from the top surface 104 of the housing 102 to the flat top portion 124 of the button 120. The protrusion 164, or the second rigid protrusion, extends a second distance, the second distance being in a direction towards the switch and extending from the inside surface 160 of the button 120 to the flat surface of the protrusion 164 that contacts the gasket 140. The first distance is larger than the second distance. Other protrusion configurations may also be used.

In a rest state, the protrusion 164 of the button 120 may or may not be in contact with the gasket 140 above the center of the switch 156. When the button 120 is pressed by a user (as seen in FIG. 8), the force upon the button 120 moves the button 120, and more specifically the protrusion 164 of the button 120, downwards onto the gasket 140 causing the dome shaped gap 170 and the switch 156 to become deformed. The switch 156 is actuated when an action is taken configured to cause a signal to be generated. For example, movement of the button 120 may cause a signal to be generated as the surface of the switch 156 touches an electrical contact pattern (not shown) located on the substrate 142. FIG. 8 further depicts the control device 100 including a length $L_{cd}$.

FIG. 7B is an enlarged view of detail B in FIG. 7A of the electronic control device 100. FIG. 7B more clearly shows the rib 158 contacting the gasket 140. In the example, the rib 158 is a continuous bump along the perimeter of the opening 130, around the button 120, on the inside wall of the housing 102. Further, FIG. 7B shows the substrate 142 having a thickness t, and an antenna 148 along the perimeter 176 of the substrate 142 located between the substrate 142 and the housing 102. In the example, forming the antenna 148 along the perimeter 176 of the substrate 142 (see FIG. 11) allows for additional size optimization of the electronic control device 100.

Figure 14:
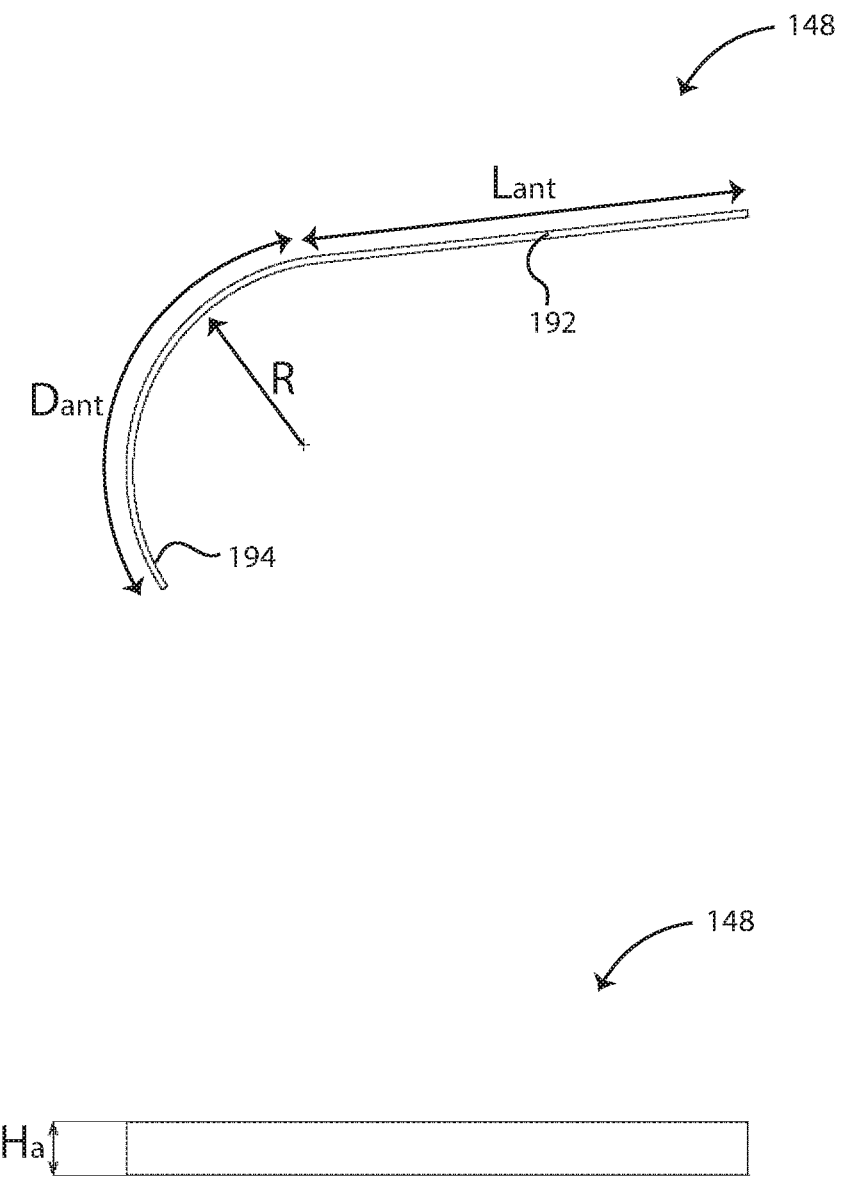
FIG. 14 is a top view and a side view of an antenna of the electronic control device of FIG. 4.

As seen in FIG. 14, the antenna 148 has a height $H_a$. In the example, the height $H_a$ of the antenna 148 is about equal or marginally greater than to the thickness t of the substrate 142. Alternatively, the height $H_a$ of the antenna 148 may be less than the thickness t of the substrate 142.

Further, FIG. 14 depicts an example shape of the antenna 148 as it runs along the perimeter of the substrate 142. The antenna 148 may have a straight portion 192, having a length $L_{ant}$, and a curved portion 194, having a circumference or distance around the curve $D_{ant}$. The curved portion 194 may have radius R. The radius R may not be consistent, and therefore the radius R may vary along the curved portion 194 of the of the antenna 148. In the example, the antenna 148 may be of the discrete chip type, or preferably a section of a plated conductive material, such as copper, known as a trace antenna. A trace antenna may implement an Inverted F Antenna (IFA) design.

Figure 9:
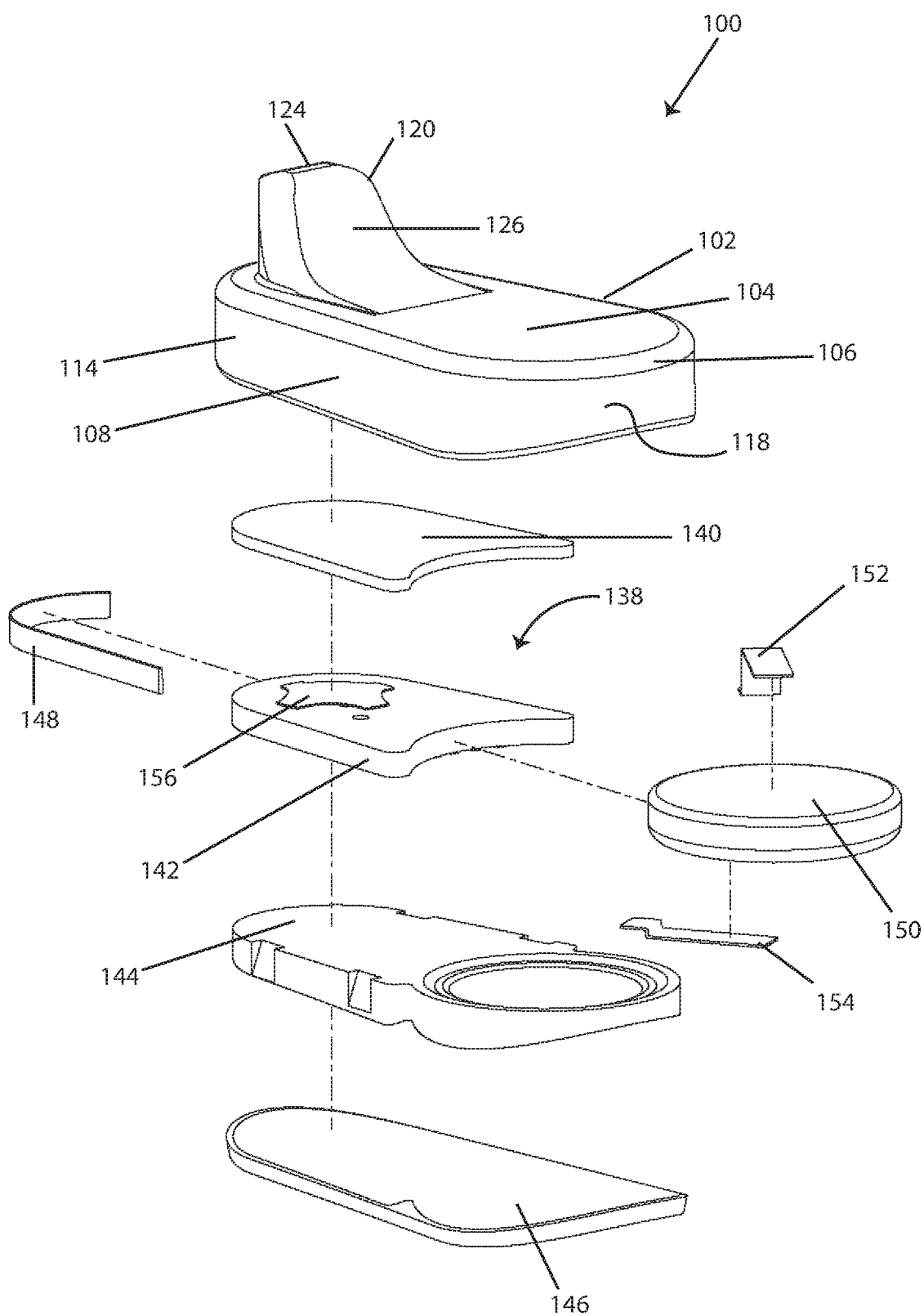
FIG. 9 is an exploded view of the electronic control device of FIG. 4.

FIG. 9 is an exploded view of the electronic control device 100. A housing 102 and a button 120 are integrally formed together creating a hinge point/line 122 where the button 120 will flex when a force is applied onto the button 120. The hinge point 122 may be a living hinge and formed as an integral part with, and/or from the same material as, the two rigid pieces it connects.

The gasket 140 covers the PCB 138 which includes a switch 156 on the substrate 142. An antenna 148 extends around a perimeter of the PCB 138. The plane P will intersect the antenna 148 as the plane P is defined by the orientation and location of the substrate 142. A top weld tab 152 and a bottom weld tab 154 secure the power source 150 to the PCB 138. The connected PCB 138 and power source 150 are placed into the housing 102 and then covered by potting material 144. The potting material 144 is in turn covered by a bottom surface 146, and the bottom surface 146 interfaces with a mounting surface of a bicycle 10.

The gasket 140 may be used as a seal and may be made of rubber, silicone, santoprene, santoprene thermoplastic vulcanizate ("Santoprene TPV"), or silicone to protect the PCB 138 from moisture and debris entering the opening 130. The gasket 140 may be a thickness between 0.005 and 0.050 inches. Preferably, the thickness of the gasket 140 may be approximately 0.020 inches.

The housing 102 and the button 120 may be constructed of any material operable to provide for the protection of the internal components, as well as able to operate as a hinge. For example, nylon or plastics such as thermoplastic elastomer (TPE) or polypropylene may be used. In an example, the housing 102, the button 120, and the hinge 122 are constructed of a thin walled plastic. Additionally, the circuitry 168 may communicate signals wirelessly from the electronic control device 100 to external devices on the bicycle 10 or external to the bicycle 10. Therefore, the housing 102 and the button 120 may be made of a material that is radio frequency ("RF") transparent, such as a plastic or other material.

In the illustrated example, the housing 102 and the button 120 are constructed from a different material than the bottom surface 146. For example, the bottom surface 146 may be a material such as a rubber, or a double-sided adhesive tape, for example a foam adhesive tape, that may be used to secure the electronic control device 100 to the bicycle 10. In an alternate embodiment, the bottom surface 146 may be made of the same material as the housing 102.

The antenna 148 may be laminated, bonded, or edge plated onto the substrate 142. A feed line for the antenna 148 (see FIG. 15) is normally arranged with a micro-strip line from a radio module. In the example, the antenna 148 may be formed and/or disposed on or along the perimeter 176 of the substrate 142 (see FIG. 11). Forming the antenna 148 may be accomplished using edge plating techniques. The substrate 142 may include traces or vias (not shown) connecting the switch 156 to the circuitry 168 of the substrate 142, such as to a radio. The radio may be within a processor 174. The radio and processor 174 include software code or programming configured to receive inputs from actuations of the switch 156 and convert those inputs into data to be wirelessly communicated.

The antenna 148 and the processor 174 including the radio may be configured to generate a signal to communicate with one or more components on the bicycle 10. The signal may be configured to be operable to change a physical state of the bicycle 10. In other words, the antenna 148 and processor 174 including the radio are configured to communicate with a network internal to the bicycle 10. For example, the antenna 148 and processor 174 including the radio are configured to communicate using an AXS Network wireless communication protocol. In one example, the antenna 148 and the radio may communicate with the rear derailleur 54 to shift gears. The antenna 148 and the radio are also configured to communicate with parts and/or network(s) external to the bicycle 10. For example, the antenna 148 and radio may communicate control signals wirelessly using any technique, protocol, or standard, such as Institute of Electrical and Electronics Engineers ("IEEE") 802.11 standards, IEEE 802.15.4, IEEE 802.15.1, BLUETOOTH® or BLUETOOTH ® low energy standards, and/or ANT™ or ANT+™ standards may be used (e.g., to communicate with a mobile device).

In the embodiment, the power source 150 is permanently affixed to the PCB 138. The top weld tab 152 and the bottom weld tab 154 may be made of a conductive material, such as nickel, copper, tungsten, etc., used for connecting the power source 150 to the substrate 142. A volume of electrically conductive bonding material, for example a fusible metal alloy such as tin, lead, brass, or silver-based solder, is disposed between the surface of the substrate 142 and the top weld tab 152 and the bottom weld tab 154. Therefore, the power source 150 is communicatively coupled to circuitry 168 of the PCB 138

In an alternate embodiment, the PCB 138 and the power source 150 may not be soldered together. Rather, the PCB 138 and the power source 150 may be electrically connected using any known method, such as tabs from the PCB 138 applying a clamping or spring force on the power source 150.

The power source 150 may be a battery such as a device having of two or more electrochemical cells that convert stored chemical energy into electrical energy. The power source 150 may include a combination of multiple batteries or other power providing devices. Specially fitted or configured battery types, or standard battery types (e.g., a disk shaped/coin-cell battery) such as a form factor of CR 2012, CR 2016, CR 1632, and/or CR 2032 may be used.

The potting material 144 may be any type of potting material. For example, plastic, silicone, or epoxy resin may be used for potting. By using potting material 144, the power source 150 may be permanently attached to the PCB assembly 138, and therefore the power source 150 may not be replaceable. This may be beneficial to achieve a small device size. The energy contained within the power source 150 may be enough to meet or exceed the mechanical life of the electronic control device 100.

Figure 10:
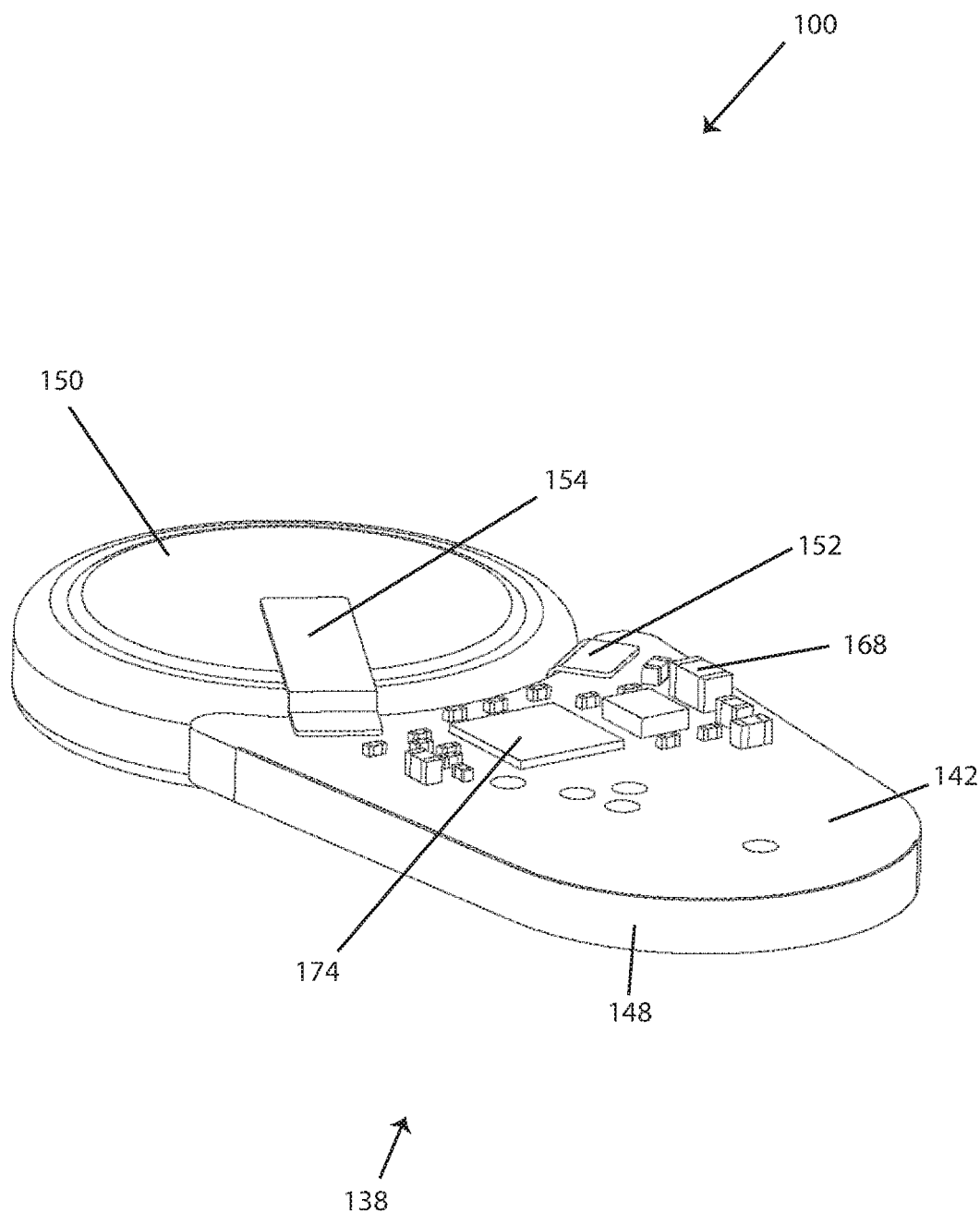
FIG. 10 is a perspective view of a printed circuit board assembly ("PCB") and a power source of the electronic control device of FIG. 4.
Figure 11:
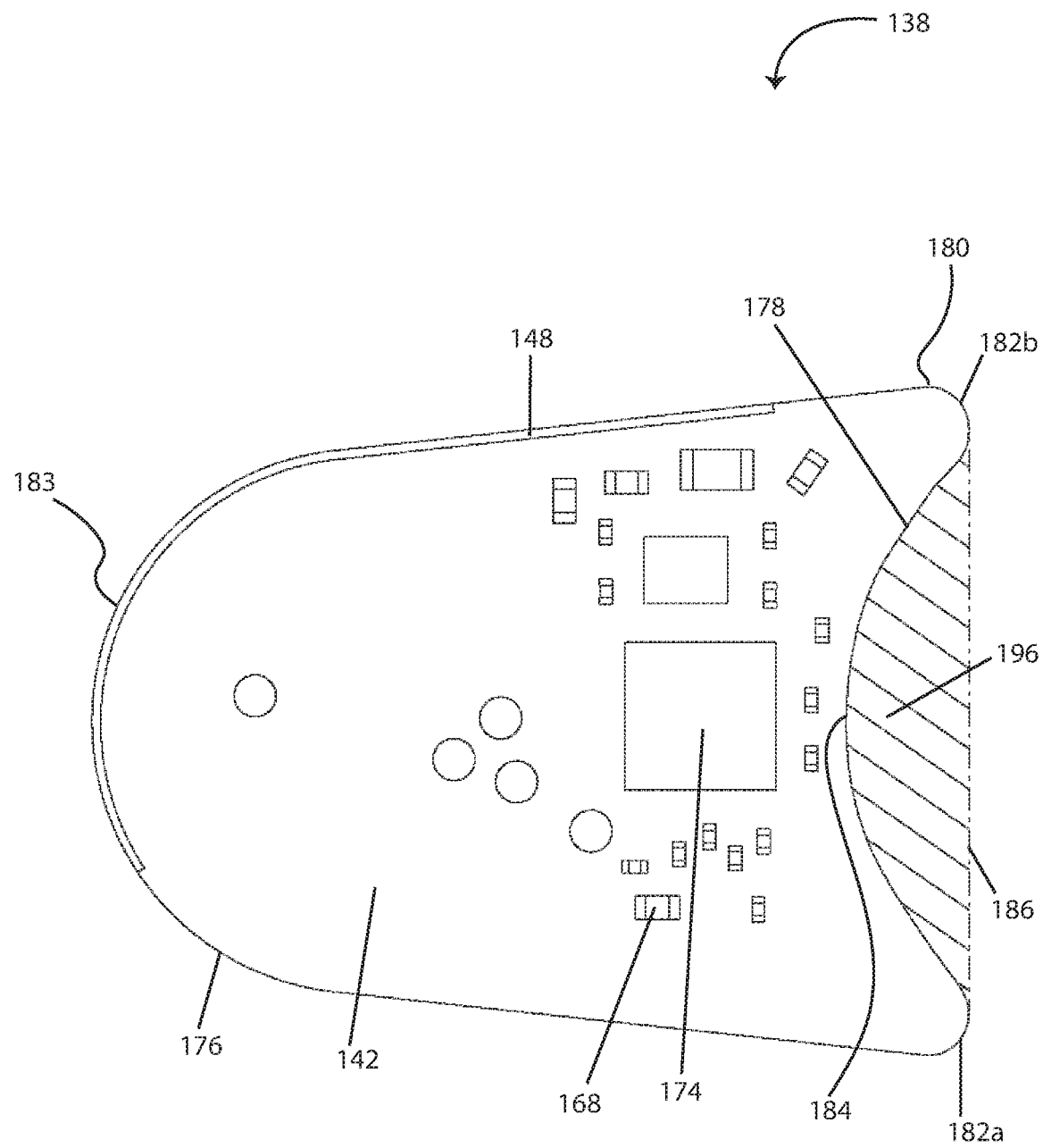
FIG. 11 is a bottom view of the PCB of the electronic control device of FIG. 4.
Figure 12:
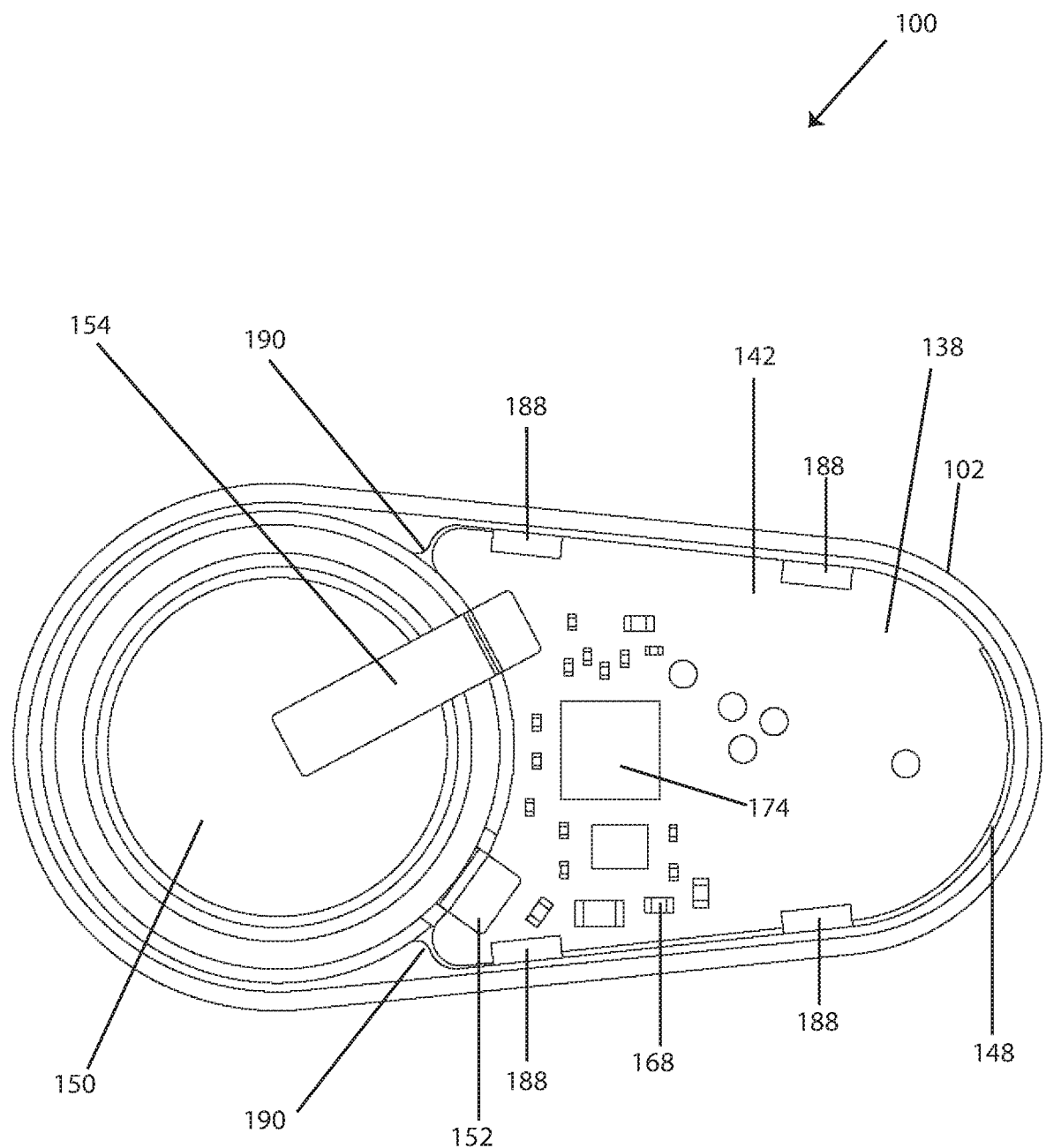
FIG. 12 is a bottom view of the PCB and the power source of the electronic control device of FIG. 4.

FIGS. 10-12 are varying views of the PCB 138 and/or power source 150. FIG. 10 depicts a perspective view of the PCB 138 and the power source 150 of the electronic control device 100. As previously mentioned, the switch 156 is disposed on the first side of the substrate 142 and the circuitry 168 is disposed on the second side of the substrate 142. In FIGS. 10-12 the PCB 138 is oriented to show the second side of the substrate 142.

The circuitry 168 includes a processor 174 and other various passive or active electrical components (e.g., capacitors, transistors, etc.). The processor 174 includes a radio running in the frequency range of 3 kHz to 2.4 GHz. For example, the processor 174 may be a microprocessor including a 2.4 GHz radio. The radio in processor 174 connects to the antenna 148 to wirelessly transmit information. In the example, the antenna 148 extends partially around a rounded end 183 of the PCB 138. The power source 150, shown as a coin-cell battery in FIG. 10, is secured to the substrate 142 through the top weld tab 152 and the bottom weld tab 154.

The substrate 142 operates to connect and/or provide structure for the circuitry 168 and components attached to the PCB 138. The substrate 142 may be flexible or rigid. In an embodiment, the substrate 142 is a rigid substrate providing a durable basis for the PCB 138. The substrate 142 is formed to provide a planar shape of the PCB 138 that optimizes the size of the electronic control device 100. Additionally, the PCB 138 may be Chip Scale Package (CSP) to further optimize size. The substrate 142 may be any substance operable to form the underlying attachment of the PCB components. For example, silicon, silicon dioxide, aluminum oxide, sapphire, germanium, gallium arsenide ("GaAs"), an alloy of silicon and germanium, or indium phosphide ("InP"), may be used.

As seen in FIG. 11, the substrate 142 includes a perimeter 176 that outlines a border of the substrate 142. The perimeter 176 includes a curved edge 178 at an interface end 180 of the substrate 142. At the opposite end, the substrate 142 includes a rounded end 183. The perimeter 176 may include one or more protruding features. The protruding features may form a recess 196 with the curved edge 178 of the perimeter 176. The protruding features may include tips 182a and 182b. The tips 182a and 182b define a boundary 186. The area between the boundary 186 and the centermost point 184 forms the space or recess 196. The power source 150 fits into the recess 196 formed at the interface end 180 of the PCB 138. The power source 150 occupies most of the recess 196 when the electronic control device 100 is assembled.

In the example of FIG. 11, the tips 182a and 182b are identical in shape. In an alternate embodiment, the tips 182a and 182b are not identical and can take on variety of shapes or sizes depending on a variety of factors, such as the shape of the housing 102, the shape of the power source 150, the shape of the PCB 138, etc. Further, in the present example, the recess 196 looks like a half or partial circle. In an alternate embodiment, the recess 196 may be any shape so long as the recess 196 fills a void in the PCB 138.

The curved edge 178 of the substrate 142 allows the length (e.g., the length $L_{cd}$ as seen in FIG. 8) of the electronic control device 100 to be optimized as part of the power source 150 is received within the PCB 138. This may allow for the length of the electronic control device to be less than if the substrate 142 did not include the curved edge 178.

FIG. 12 shows the power source 150 and the PCB 138 secured within the housing 102 of the electronic control device 100. The housing 102 includes ramps 188 to hold the PCB 138 in place. During assembly, the power source 150 and the PCB 138 are inserted into the housing 102 and pressed over ramps 188 to secure the PCB 138 within the housing 102. The housing 102 additionally includes alignment features 190 that may aid in securely holding the power source 150 in place.

Figure 15:
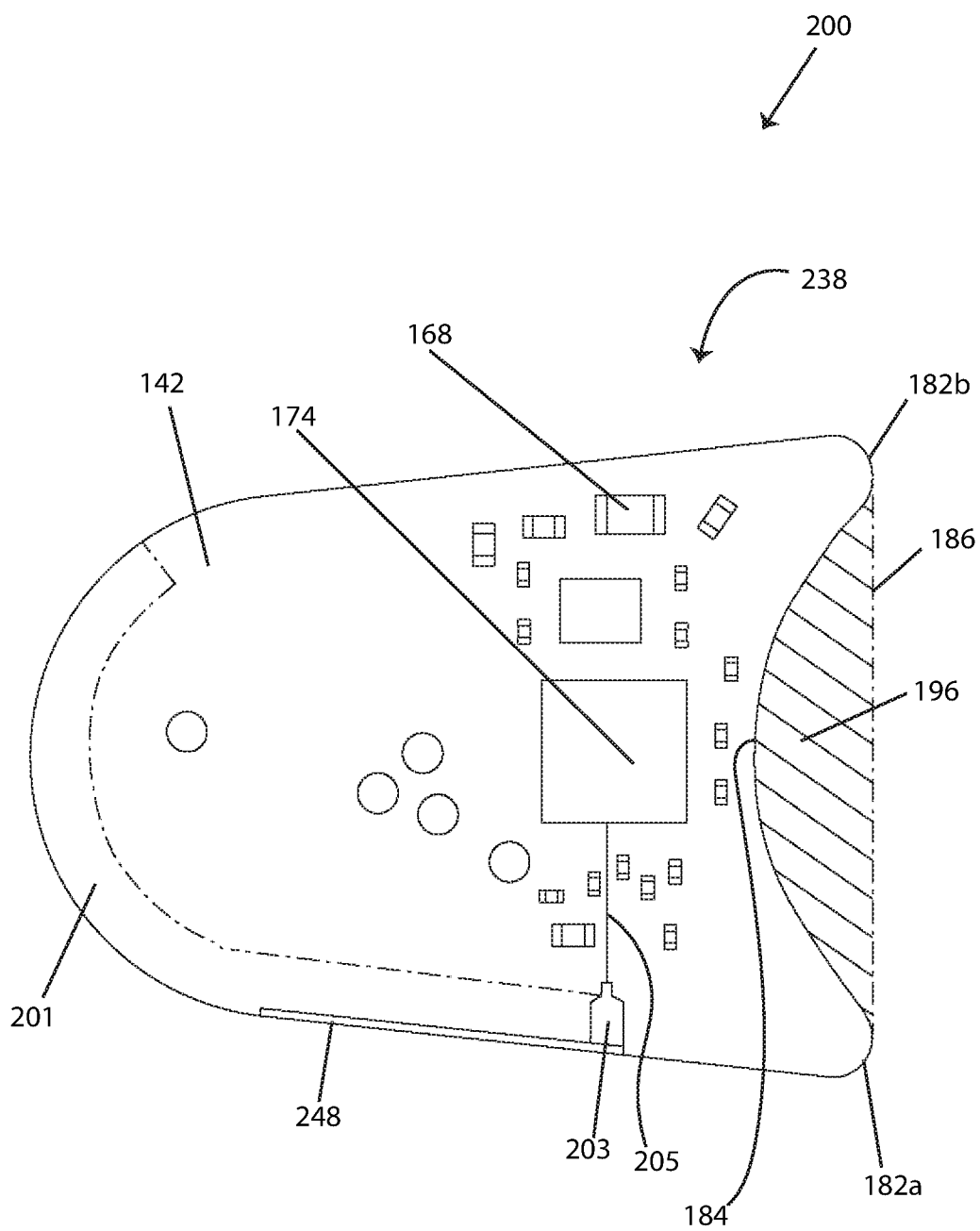
FIG. 15 is a bottom view of a PCB of an electronic control device according to one embodiment.

FIG. 15 is a top view of a PCB 238 of an electronic control device 200 according to one embodiment. The example of the PCB 238 shown in FIG. 15 differs from the example shown in FIGS. 7A-12 in that the antenna 248 has a different shape than the antenna 148 in FIGS. 7A-12. The antenna 248 may extend partially or wholly around the perimeter 176 of the PCB 238, following the rounded end 183 of the PCB 238, as needed to increase or decrease the surface area of the antenna 248. In the embodiments, although the antenna 248 and 148 are disclosed as being located along the perimeter of the PCB 238 and 138, the antennas 248 and 148 can be located anywhere on the PCBs 238 and 138. The antenna trace length on the PCB 238 will determine the resonant frequency of the antenna 248. The shorter the trace length, the higher the frequency will be. Larger antennas may have higher theoretical maximum efficiencies. Antennas with higher theoretical maximum efficiencies may require a larger clearance area (e.g., a distance to an edge of the substrate) compared to antennas having lower theoretical maximum efficiencies. However, chip surface antennas, or trace antennas, may provide sufficient antenna performance without requiring a very large clearance area.

FIG. 15 discloses in more detail the connection between the antenna 248 and the processor 174 (the processor 174 including a radio). An antenna connection 203 and antenna feed line 205 connect the antenna 248 to the processor 174. A space 201 is reserved as a ground clearance for the antenna 248, and therefore the space 201 is a ground free area on the PCB 238. The remainder of the PCB 238 and/or power source 150 may act as a ground plane for the antenna 248. Between the processor 174 and the antenna 248 will be a filter matching the impedance of the processor 174 to the antenna 248. In an example, it is desirable to have the antenna 248 as close as possible to the processor 174. A ground plane may be an area of metallic foil (e.g., such as copper) having good conductivity. A ground plane may be flat or nearly flat horizontal conducting surface that serves as part of an antenna, to reflect the radio waves from the other antenna elements. A ground plane shape and size may play major roles in determining an antenna's radiation characteristics including gain.

Figure 16:
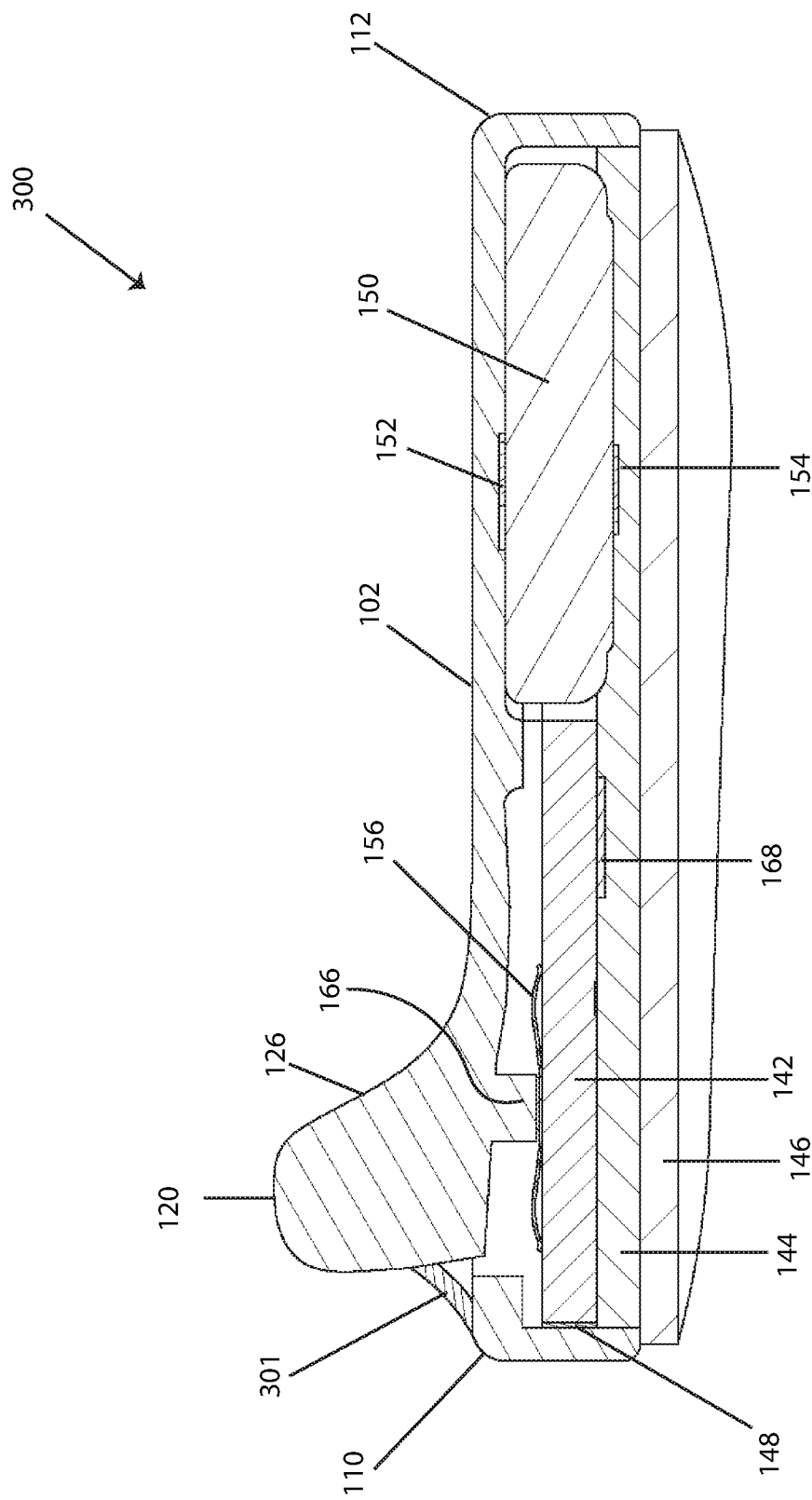
FIG. 16 is a section view of an electronic control device according to one embodiment.

FIG. 16 is a section view of an electronic control device 300 according to one embodiment. The example electronic control device 300 differs from the examples shown in FIGS. 4-12 because the rib 158 and the gasket 140 are not included in the electronic control device 300. Instead, a sealing element 301 is included. The sealing element 301 may be formed of a compliant material. The sealing element 301 has the necessary flexibility to allow the button 120 to dip and rise freely but prevents the ingress of debris and moisture through the opening 130. The sealing element 301 may be formed as a co-molded bellows surrounding the button 120, rubber, silicone (e.g., formed by a liquid silicone resin process), TPE (e.g., Santoprene or Santoprene TPV), plastic material adhered between the button 120 and the housing 102, etc. In the example of FIG. 16, the switch 156 may be secured to the substrate 142 using a thin tape, or other common adhesive means. In an alternate embodiment, the rib 158 and the gasket 140 may be used in combination with the sealing element 301.

Returning to FIGS. 10-12, the circuitry 168 and processor 174 may be used alone or in combination to communicate with and control bicycle components. The processor 174 or circuitry 168 may include a memory and transmitter, receiver or transceiver.

The processor 174 may include a general processor/microprocessor, digital signal processor, an application specific integrated circuit (ASIC), field programmable gate array (FPGA), analog circuit, digital circuit, combinations thereof, or other now known or later developed processor. The processor 174 may be a single device or combinations of devices, such as through shared or parallel processing.

The memory may be a volatile memory or a non-volatile memory. The memory may include one or more of a read only memory (ROM), random access memory (RAM), a flash memory, an electronic erasable program read only memory (EEPROM), or other type of memory. The memory may be a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The electronic control device 100 is configured to send data such as control signals and/or commands to bicycle components. The electronic control device 100 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, the methods described herein may be implemented with software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a receiver 310 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electronic control device for a bicycle, comprising:
a housing;
a planar printed circuit board ("PCB") disposed within the housing, the planar PCB having a substrate, the substrate having a thickness between a top surface and a bottom surface, and a perimeter surface extending along an outwardly facing edge of the thickness of the substrate,
a power source disposed within the housing;
an antenna located between the substrate and the housing on the perimeter surface of the substrate; and
a switch, the switch located on the planar PCB and configured to control a component of the bicycle,
wherein a plane extending throughout the thickness of the substrate intersects both the power source and the antenna.

2. The electronic control device of claim 1, wherein the power source is disk shaped.

3. The electronic control device of claim 2, wherein the planar PCB has an interface end, the interface end including a recess.

4. The electronic control device of claim 3, wherein an edge of the substrate at the recess is formed as a curve.

5. The electronic control device of claim 4, wherein the edge of the substrate formed as a curve has tips and a centermost point defining a space therebetween.

6. The electronic control device of claim 5, wherein the power source is disposed within the space.

7. The electronic control device of claim 1, wherein the power source has a length and a height, the length of the power source being substantially greater than the height of the power source.

8. The electronic control device of claim 7, wherein the plane intersects the power source through an entirety of the length of the power source.

9. The electronic control device of claim 1, wherein the antenna is disposed along at least a portion of the perimeter surface of the substrate.

10. The electronic control device of claim 9, wherein the antenna extends along the thickness of the perimeter surface of the substrate.

11. The electronic control device of claim 1, wherein the antenna is a trace antenna.

12. The electronic control device of claim 1, wherein the switch is disposed on the top surface of the substrate and circuitry is disposed on the bottom surface of the substrate.

13. The electronic control device of claim 12, wherein the switch is a dome switch.

14. The electronic control device of claim 12, wherein the housing includes a button integrally formed with the housing and disposed above the switch, the switch being actuated by the button when a force is applied on the button.

15. The electronic control device of claim 14, wherein the button includes a first rigid protrusion extending a first distance in a first direction and a second rigid protrusion extending a second distance in a second direction, the first distance being greater than the second distance, and the first direction is opposite the second direction.

16. The electronic control device of claim 15, wherein the second rigid protrusion includes a flat surface, the flat surface engaging the switch when the force is applied on the first rigid protrusion.

17. The electronic control device of claim 14, wherein the button and the housing are connected by a flexible hinge, and the button, the housing and the flexible hinge are constructed from the same material and formed as a single unitary structure.

18. The electronic control device of claim 1, wherein the electronic control device is configured to be mounted to a handlebar of the bicycle.

19. The electronic control device of claim 1, wherein the antenna has a height greater than or equal to the thickness of the substrate.

* * * * *